United States Patent
Ishibashi

(10) Patent No.: US 10,281,735 B2
(45) Date of Patent: May 7, 2019

(54) OPTICAL SYSTEM AND OPTICAL APPARATUS INCORPORATING THE SAME

(71) Applicant: CANON KABUSHIKI KAISHA, Tokyo (JP)

(72) Inventor: Tomohiko Ishibashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 15/688,510

(22) Filed: Aug. 28, 2017

(65) Prior Publication Data

US 2018/0067333 A1 Mar. 8, 2018

(30) Foreign Application Priority Data

Sep. 5, 2016 (JP) .................. 2016-173141

(51) Int. Cl.
| | |
|---|---|
| *G02B 13/18* | (2006.01) |
| *G02B 27/58* | (2006.01) |
| *G02B 7/28* | (2006.01) |
| *G02B 13/20* | (2006.01) |
| *H04N 5/232* | (2006.01) |
| *H04N 5/238* | (2006.01) |
| *G02B 13/00* | (2006.01) |
| *G02B 5/00* | (2006.01) |
| *G02B 27/00* | (2006.01) |
| *G02B 9/62* | (2006.01) |
| *G02B 9/60* | (2006.01) |

(52) U.S. Cl.
CPC ............. *G02B 27/58* (2013.01); *G02B 7/28* (2013.01); *G02B 13/20* (2013.01); *H04N 5/238* (2013.01); *H04N 5/23212* (2013.01); *G02B 5/005* (2013.01); *G02B 9/60* (2013.01); *G02B 9/62* (2013.01); *G02B 13/004* (2013.01); *G02B 13/0045* (2013.01); *G02B 13/18* (2013.01); *G02B 27/0025* (2013.01)

(58) Field of Classification Search
CPC .. G02B 13/0045; G02B 27/0025; G02B 9/60; G02B 13/18; G02B 9/62; G02B 13/004; G02B 5/005; G02B 7/28; G02B 27/58; G02B 13/20; H04N 5/23212; H04N 5/238
USPC ........ 359/663, 713–717, 722, 723, 739, 740, 359/757, 760, 764
See application file for complete search history.

(56) References Cited

U.S. PATENT DOCUMENTS

| | | | | | |
|---|---|---|---|---|---|
| 3,843,235 | A | * | 10/1974 | Mino ................ | G02B 13/20 359/738 |
| 4,013,347 | A | * | 3/1977 | Nakamura .......... | G02B 13/00 359/707 |
| 4,825,235 | A | * | 4/1989 | Wakabayashi ...... | G02B 13/20 359/707 |

(Continued)

FOREIGN PATENT DOCUMENTS

| | | |
|---|---|---|
| WO | 2016/039147 A1 | 3/2016 |
| WO | 2016038935 A1 | 3/2016 |

*Primary Examiner* — Evelyn A Lester
(74) *Attorney, Agent, or Firm* — Canon USA Inc., IP Division

(57) ABSTRACT

An optical system includes an aperture diaphragm, a first optical element disposed on a light incident side of the aperture diaphragm, and a second optical element disposed on a light emission side of the aperture diaphragm. Transmittance distribution of the first optical element satisfies a predetermined conditional expression. Transmittance distribution of the second optical element satisfies a predetermined conditional expression.

14 Claims, 20 Drawing Sheets

(56) References Cited

U.S. PATENT DOCUMENTS

| | | | | |
|---|---|---|---|---|
| 4,908,639 | A * | 3/1990 | Yanagisawa | G02B 13/20 359/740 |
| 6,388,822 | B1 * | 5/2002 | Kitamura | G02B 1/11 359/369 |
| 6,806,988 | B2 * | 10/2004 | Onuki | G02B 3/14 359/245 |
| 8,179,520 | B2 * | 5/2012 | Tokimitsu | G02B 1/115 355/71 |
| 2016/0341973 | A1 * | 11/2016 | Ida | G02B 27/58 |

* cited by examiner

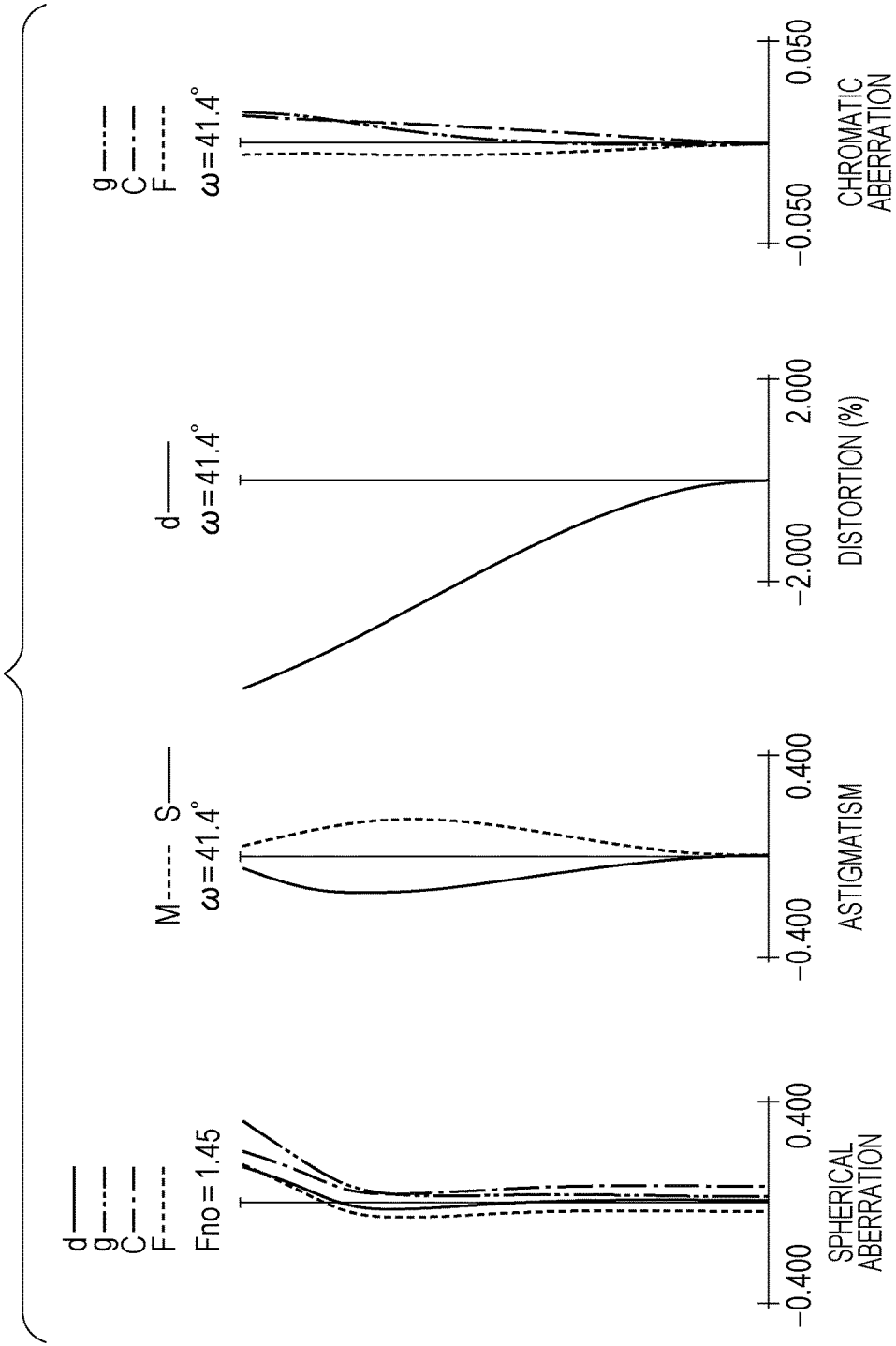

OPTICAL SYSTEM AND OPTICAL APPARATUS INCORPORATING THE SAME

BACKGROUND OF THE INVENTION

Field of Invention

The present disclosure relates to an optical system and an optical apparatus incorporating the same. The present disclosure is applicable to, for example, an image pickup apparatus using an image pickup element, such as a digital video camera, a digital still camera, and a broadcasting camera, or an image pickup apparatus using silver-halide film, such as a silver-halide film camera.

Description of Related Art

The appearance of a defocused image (a blurred image) may be an important feature of the optical performance of an image pickup optical system. One of the factors which determine appearance of a blurred image is the light quantity distribution of the blurred image. Light quantity distribution in a blurred image in which no rapid change takes place and a gradual decrease in the light quantity in the vicinity of an outline of the blurred image are especially preferred.

Such light quantity distribution is achieved by an apodization effect. An apodization effect is obtained by using an optical element in which transmittance decreases as the distance from an optical axis increases.

International Publication No. 2016/039147 describes an optical system in which an optical element having transmittance distribution is disposed on both the front and rear sides of an aperture diaphragm in order to uniformly provide an apodization effect to both an on-axis beam and an off-axis beam.

Since a light path of a light beam in an optical system changes depending on an in-focus distance of the optical system, light quantity distribution of the light beam changes depending on the in-focus distance of the optical system. To address this problem, International Publication No. 2016/039147 describes that a change in the apodization effect on the off-axis beam when the in-focus distance changes can be reduced by providing an optical element having transmittance distribution at both an object side end and an image side end of the optical system.

However, a change in an apodization effect on the on-axis beam caused by a change in an in-focus distance is not considered in International Publication No. 2016/039147. Therefore, in the optical system described in International Publication No. 2016/039147, when the in-focus distance changes, the appearance of a blurred image at the center of an image may change.

SUMMARY OF INVENTION

The present disclosure provides an optical system capable of reducing a change in an apodization effect caused by a change in an in-focus distance.

An optical system which includes a plurality of lens elements and in which at least one of the plurality of lens elements moves during focusing, the optical system including: an aperture diaphragm; a first optical element disposed on a light incident side of the aperture diaphragm and having transmittance distribution; and a second optical element disposed on a light emission side of the aperture diaphragm and having transmittance distribution, wherein the following conditional expressions are satisfied:

$$0.6 \leq Te1/T1 \leq 1$$

$$0 \leq Te2/T2 \leq 0.4$$

where T1 is a maximum transmittance of the first optical element, T2 is a maximum transmittance of the second optical element, Te1 is transmittance of the first optical element at a position in which a marginal ray of an on-axis light flux enters the first optical element when the aperture diaphragm is opened and the optical system focuses on infinity, and Te2 is transmittance of the second optical element at a position in which the marginal ray enters the second optical element when the aperture diaphragm is opened and the optical system focuses on infinity.

Further features of the present invention will become apparent from the following description of exemplary embodiments with reference to the attached drawings.

BRIEF DESCRIPTION OF THE DRAWINGS

FIGS. 6A and 6B are aberration charts of the optical system of the third embodiment.

DESCRIPTION OF THE EMBODIMENTS

Figure 1A:
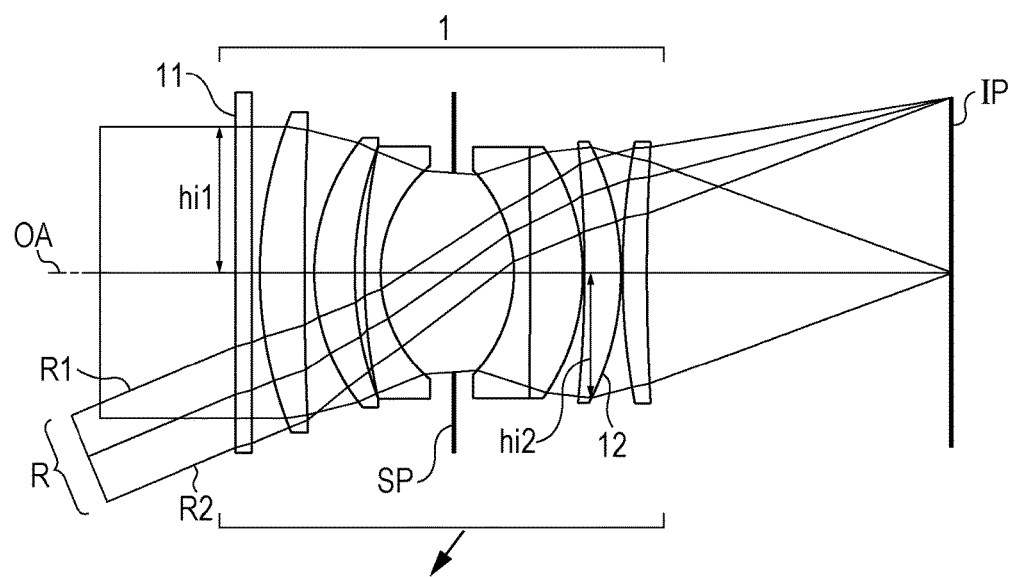
FIGS. 1A and 1B are cross-sectional views of an optical system of a first embodiment.

Hereinafter, embodiments of an optical system and an optical apparatus incorporating the optical system of the present disclosure will be described.

FIGS. 1A, 3A, 5A, 7A, 9A, and 11A are cross-sectional views of optical systems focusing on infinity respectively according to a first embodiment to a sixth embodiment. FIGS. 1B, 3B, 5B, 7B, 9B, and 11B are cross-sectional views of the optical systems focusing on the closest focusing distance respectively according to the first to sixth embodiments.

In each cross-sectional view of the optical system a multi-unit lens having its object side on the left-hand side of the figure and its image side on the right-hand side thereof is illustrated. Accordingly, IP denotes an image plane. When the optical system of each embodiment is used as an image pickup optical system of a video camera or a digital camera, the image pickup element, such as a CCD sensor or a CMOS sensor, is disposed on the image plane IP. When the optical system of each embodiment is used as an image pickup optical system of a silver-halide film camera, film is disposed on the image plane IP. OA denotes the optical axis.

The optical system of each embodiment includes a plurality of lens elements, and at least one of the lens elements is moved during focusing. The optical system of each embodiment includes an aperture diaphragm SP, a first optical element disposed on a light incident side (object side) of the aperture diaphragm SP, and a second optical element disposed on a light emission side (image side) of the aperture diaphragm SP.

The first optical element and the second optical element each have transmittance distribution. The transmittance distribution of the first optical element and the transmittance distribution of the second optical element may desirably have an apodization effect. In such transmittance distribution, transmittance may linearly decrease or transmittance may exponentially decrease toward a periphery of an optical element. Further, an area where transmittance is constant may be provided at the center of the element.

Such transmittance distribution can be obtained by shaping or by forming as a film on the substrate of the optical element a material which absorbs or reflects light so that a transmittance distribution may be obtained in accordance with the position of the film on the element. Further, a photosensitive substance, such as silver-halide particles, may be applied to a substrate, and the substrate may be exposed so that transmittance distribution is caused, whereby transmittance distribution is obtained. The substrate may be plate-shaped or may be film-shaped. An optical element having a curvature, such as a lens, may be used as a substrate.

A medium containing a substance which absorbs light, such as colored glass, may also be used. In this case, transmittance distribution may be obtained by changing a thickness of the medium containing the substance which absorbs light, or transmittance distribution may be obtained by partially changing a density of the substance which absorbs light in the medium.

An electrochromic element formed to generate transmittance distribution upon application of a voltage may be used as at least one of the first optical element and second optical element. In this case, although transmittance distribution of the electrochromic element changes depending on the voltage applied thereto, the electrochromic element may desirably be configured such that transmittance distribution which satisfies conditional expression (1) or (2) described below at a certain applied voltage may be obtained.

Figure 1B:
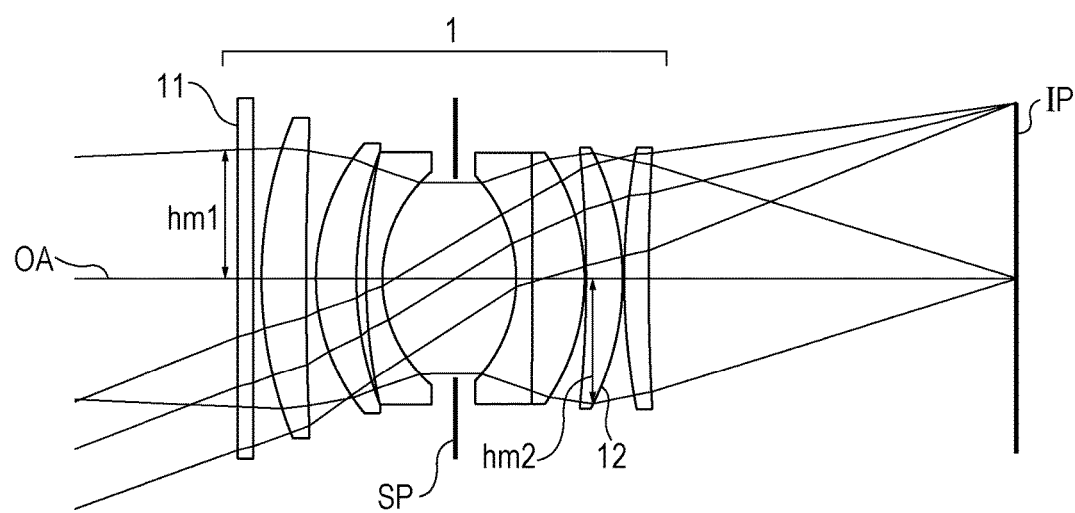

In an optical system 1 of a first embodiment illustrated in FIGS. 1A and 1B, the reference numeral 11 denotes a first optical element and reference numeral 12 denotes a second optical element. In an optical system 2 of a second embodiment illustrated in FIGS. 3A and 3B, reference numeral 21 denotes a first optical element and reference numeral 22 denotes a second optical element. In an optical system 3 of a third embodiment illustrated in FIGS. 5A and 5B, reference numeral 31 denotes a first optical element and reference numeral 32 denotes a second optical element.

Figure 7A:
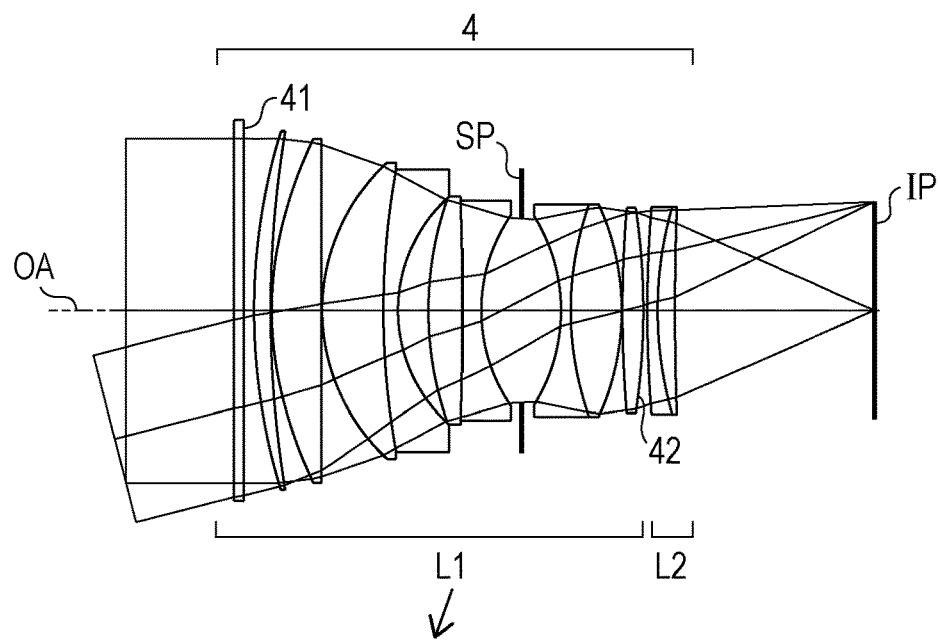
FIGS. 7A and 7B are cross-sectional views of an optical system of a fourth embodiment.
Figure 7B:
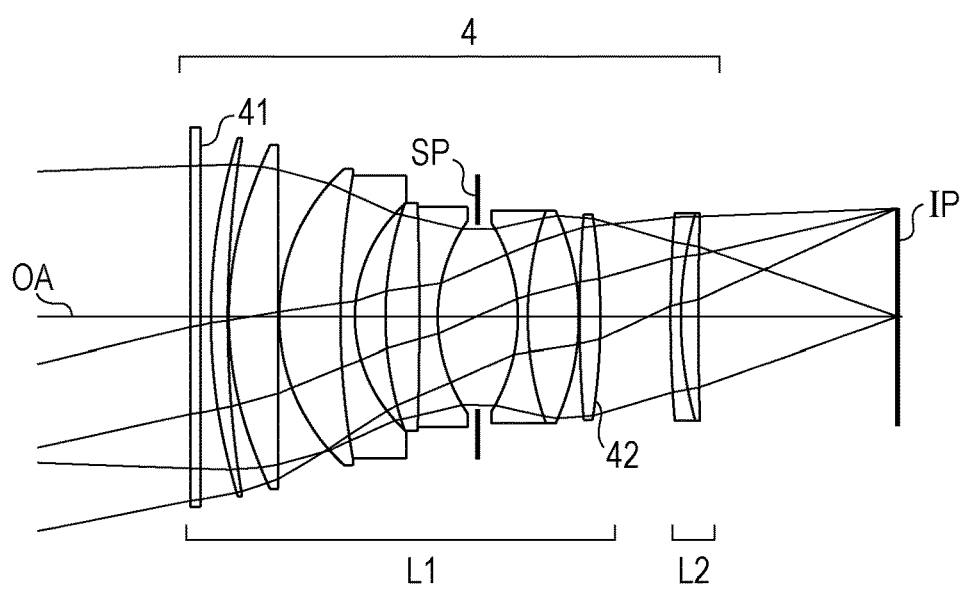

In an optical system 4 of a fourth embodiment illustrated in FIGS. 7A and 7B, reference numeral 41 denotes a first optical element and reference numeral 42 denotes a second optical element. In an optical system 5 of a fifth embodiment illustrated in FIGS. 9A and 9B, reference numeral 51 denotes a first optical element and reference numeral 52 denotes a second optical element. In an optical system 6 of a sixth embodiment illustrated in FIGS. 11A and 11B, reference numeral 61 denotes a first optical element and reference numeral 62 denotes a second optical element.

As described above, in the light quantity distribution of a blurred image, light quantity is desirably reduced gradually in the vicinity of an outline of that blurred image. If light quantity is increased in the vicinity of the outline (edge portion) of the blurred image, a contour of the blurred image is emphasized, which is unfavorable. A blurred image here is not an image blurred due to moving objects or camera shake due to hand movement, but an image focused in front of or behind the focal plane by a focus depth or greater (a defocused image).

Since the optical system of each embodiment includes the first optical element and the second optical element described above, light quantity can be gradually decreased in the vicinity of an outline of the blurred image in the light quantity distribution of the blurred image.

Here, regarding the optical system of each embodiment, a reason for which the optical elements having transmittance distribution are provided on the light incident side and the light emission side of the aperture diaphragm SP will be described.

In an image pickup optical system, a diameter of a light beam which focuses on the image plane IP generally decreases as an image formation point is separated from an intersection of the image plane IP and the optical axis OA in a direction orthogonal to the optical axis OA. That is, the diameter of the light beam decreases as the image height to be focused increases. This is because an off-axis beam is shaded (reduction in brightness) by a lens end, a lens barrel, a press ring, an aperture diaphragm, a flare cutter, and so forth. This phenomenon is called vignetting.

In such an optical system, areas in which light beams focused on each image height pass through an arbitrary cross-section orthogonal to the optical axis OA differ from each other. Therefore, if one optical element having transmittance distribution is applied in such an optical system, sufficient light quantity distribution cannot be provided to a light beam with a large image height to be focused, and light quantity distribution may change greatly depending on the image height, or asymmetrical light quantity distribution may be provided in a meridional direction.

As an example of a light beam with a large image height to be focused, an off-axis beam R in the cross-sectional view of the optical system 1 illustrated in FIG. 1A will be discussed.

On the object side of the aperture diaphragm SP, an upper line R1 of the off-axis beam R passes closer to the optical axis OA than a lower line R2. Therefore, if the optical element having transmittance distribution is applied only on the light incident side of the aperture diaphragm SP, a light reduction amount of the upper line R1 of the off-axis beam R by the optical element is smaller than a light reduction amount of the lower line R2 of the off-axis beam R. On the contrary, on the image side of the aperture diaphragm SP, the lower line R2 passes closer to the optical axis OA than the upper line R1. Therefore, if the optical element having transmittance distribution is applied only on the light emission side of the aperture diaphragm SP, the light reduction amount of the lower line R2 is smaller than the light reduction amount of the upper line R1.

That is, if only one optical element having transmittance distribution is applied to the optical system, the light quantity distribution of the off-axis beam R becomes asymmetrical. It is therefore difficult to effectively provide the apodization effect to each light beam which focuses at each image height by using only a single optical element having transmittance distribution.

On the other hand, if the optical element having transmittance distribution is applied on the light incident side and on the light emission side of the aperture diaphragm SP, the light quantity distribution provided by these optical elements overlap each other. Therefore, asymmetry of the light quantity distribution caused when only one optical element having transmittance distribution is applied can be reduced. Therefore, the apodization effect can be effectively provided to each light beam which focuses at each image height by providing the first optical element on the light incident side of the aperture diaphragm SP and providing the second optical element on the light emission side of the aperture diaphragm SP.

Next, a change in the apodization effect caused by a change in the in-focus distance will be described.

The optical system of each embodiment may perform focusing by moving some or all of the lens elements thereof. During focusing, the height of the on-axis beam and the height of the off-axis beam at each lens position of the image pickup optical system change depending on the in-focus distance. Therefore, when the in-focus distance changes, the light quantity distribution provided to the light beam changes. In order to reduce the change in the apodization effect caused by the change in the in-focus distance, the optical element having transmittance distribution may desirably be disposed at a position in which the change in height of the light beam upon focusing is small.

An amount of change in height of the light beam caused by the change in the in-focus distance differs on the front and rear sides of the aperture diaphragm SP. The amount of change in height of the light beam caused by the change in the in-focus distance also differs depending on the image height to be focused. In the optical system of each embodiment, the change in height of the on-axis beam caused by the change in the in-focus distance is relatively small on the image side of the aperture diaphragm SP, whereas the change tends to be larger on the object side of the aperture diaphragm SP. The change in height of the off-axis beam caused by the change in the in-focus distance tends to be relatively small both on the object side of the aperture diaphragm SP and on the image side of the aperture diaphragm SP.

For example, regarding the optical system 1 of the first embodiment, when FIG. 1A and FIG. 1B are compared, the change in height of the off-axis beam caused by the change in the in-focus distance is small on both the front and rear sides of the aperture diaphragm SP. On the other hand, the change in height of the on-axis beam caused by the change in the in-focus distance is small on the light emission side of the aperture diaphragm SP, whereas the change increases on the light incident side of the aperture diaphragm SP.

Therefore, if the first optical element and the second optical element are disposed so that light quantity distribution is applied to the on-axis beam by mainly the second optical element, the change in the apodization effect caused by the change in the in-focus distance can be reduced.

Then, it is preferable that the optical system of each embodiment satisfies the following conditional expressions (1) and (2) at the same time.

$$0.6 \leq Te1/T1 \leq 1 \tag{1}$$

$$0 \leq Te2/T2 \leq 0.4 \tag{2}$$

In the conditional expressions (1) and (2), T1 denotes the largest transmittance of the first optical element. T2 denotes the largest transmittance of the second optical element. Te1 denotes transmittance of the first optical element at a position in which marginal rays of the on-axis beam enter the first optical element when the aperture diaphragm SP is opened and the optical system focuses on infinity. Te2 denotes transmittance of the second optical element at a position in which the marginal rays of the on-axis beam enter the second optical element when the aperture diaphragm SP is opened and the optical system focuses on infinity.

The conditional expression (1) relates to light quantity distribution of an on-axis beam provided by the first optical element. If the light quantity distribution of the on-axis beam provided by the first optical element increases to fall below a lower limit value of the conditional expression (1), it becomes difficult to reduce a change in the apodization effect when the height of the on-axis beam in the first optical element changes with a change in the in-focus distance. A value of Te1/T1 does not exceed 1.

The conditional expression (2) relates to light quantity distribution of an on-axis beam provided by the second optical element. If the light quantity distribution of the on-axis beam provided by the second optical element decreases to exceed an upper limit value of the conditional expression (2), the light quantity distribution provided to the on-axis beam becomes excessively small, and it becomes difficult to sufficiently obtain the apodization effect. A value of Te2/T2 does not become smaller than 0.

A numerical value range of the conditional expression (1) is desirably set for Expression (1a) to Expression (1d) in this order.

$$0.6 \leq Te1/T1 \leq 0.98 \tag{1a}$$

$$0.6 \leq Te1/T1 \leq 0.96 \tag{1b}$$

$$0.6 \leq Te1/T1 \leq 0.92 \tag{1c}$$

$$0.6 \leq Te1/T1 \leq 0.90 \tag{1d}$$

A numerical value range of the conditional expression (2) is desirably set for Expression (2a) to Expression (2d) in this order.

$$0 \leq Te2/T2 \leq 0.36 \tag{2a}$$

$$0 \leq Te2/T2 \leq 0.32 \tag{2b}$$

$$0 \leq Te2/T2 \leq 0.30 \tag{2c}$$

$$0 \leq Te2/T2 \leq 0.28 \tag{2d}$$

A change in the height of the light beam upon focusing can be further reduced by appropriately defining the magnitude of relative refractive power of the optical system disposed on the light incident side of the aperture diaphragm SP or the optical system disposed on the light emission side of the aperture diaphragm SP with respect to an entire optical system. Therefore, in order to further reduce the change in the apodization effect caused by the change in the in-focus distance, it is desirable to satisfy at least one of the conditional expression (3) and the conditional expression (4) below.

$$0.6 \leq f/fr \leq 4 \tag{3}$$

$$1.4 \leq ff/fr \leq 10 \tag{4}$$

In the conditional expressions (3) and (4), f denotes a focal length of the entire optical system when focusing on infinity. fr denotes a focal length of the optical system disposed on the light emission side of the aperture diaphragm SP when focusing on infinity. ff denotes a focal length of the optical system disposed on the light incident side of the aperture diaphragm SP when focusing on infinity.

The conditional expression (3) relates to a value of a ratio between f and fr which can further reduce the change in the apodization effect caused by the change in the in-focus distance. The conditional expression (4) relates to a value of a ratio between ff and fr which can further reduce the change in the apodization effect caused by the change in the in-focus distance.

If f/fr is less than a lower limit value of the conditional expression (3) or if ff/fr is less than a lower limit value of the conditional expression (4), refractive power of the optical system on the image side of the aperture diaphragm SP becomes relatively smaller, and a change in the height of the on-axis beam and the off-axis beam upon focusing on the image side of the aperture diaphragm SP becomes larger.

If f/fr exceeds an upper limit value of the conditional expression (3) or if ff/fr exceeds an upper limit value of the conditional expression (4), refractive power of the optical system on the image side of the aperture diaphragm SP becomes excessively large and a change in height of the off-axis beam upon focusing on the object side of the aperture diaphragm SP becomes larger.

Therefore, by satisfying at least one of the conditional expression (3) and the conditional expression (4), a change in the height of the light beam upon focusing can be reduced, and a change in the apodization effect caused by a change in the in-focus distance can be further reduced.

A numerical value range of the conditional expression (3) is desirably set for Expression (3a) to Expression (3d) in this order.

$$0.64 \leq f/fr \leq 3.2 \tag{3a}$$

$$0.68 \leq f/fr \leq 2.4 \tag{3b}$$

$$0.72 \leq f/fr \leq 2.0 \tag{3c}$$

$$0.76 \leq f/fr \leq 1.8 \tag{3d}$$

A numerical value range of the conditional expression (4) is desirably set for Expression (4a) to Expression (4d) in this order.

$$1.6 \leq ff/fr \leq 8 \tag{4a}$$

$$1.8 \leq ff/fr \leq 7 \tag{4b}$$

$$2.0 \leq ff/fr \leq 6 \tag{4c}$$

$$2.2 \leq ff/fr \leq 5.4 \tag{4d}$$

Further, by appropriately determining the height at which the marginal rays of the on-axis beam enter the first optical element, the change in the apodization effect caused by the change in the in-focus distance can be further reduced. Therefore, the following conditional expression (5) is desirably satisfied.

$$0.6 \leq hm1/hi1 \leq 0.96 \tag{5}$$

In the conditional expression (5), hi1 denotes a distance from a position in which the marginal rays of the on-axis beam when focusing on infinity enter the first optical element to the optical axis OA. hm1 denotes a distance from a position in which the marginal rays of the on-axis beam when focusing on the closest focusing distance enter the first optical element to the optical axis OA.

The conditional expression (5) relates to a change at a position in which the marginal rays of the on-axis beam enter the first optical element caused by a change in the in-focus distance. As described above, when the in-focus distance changes, the height of the on-axis beam on the object side of the aperture diaphragm SP changes relatively larger. The first optical element which satisfies the conditional expression (1) is provided on the light incident side of the aperture diaphragm SP. However, light quantity distribution may be slightly applied to the on-axis beam by the first optical element. At this time, when the first optical element is provided at the position in which a value of hm1/hi1 is smaller than a lower limit value of the conditional expression (5), a change in light quantity distribution provided in the on-axis beam by a change in the in-focus distance becomes larger.

When the in-focus distance changes, the height of the on-axis beam on the object side of the aperture diaphragm SP changes relatively larger. Therefore, it is difficult to bring hm1/hi1 close to 1 rather than the upper limit value of the conditional expression (5).

A numerical value range of the conditional expression (5) is desirably set for Expression (5a) to Expression (5d) in this order.

$$0.64 \leq hm1/hi1 \leq 0.96 \tag{5a}$$

$$0.68 \leq hm1/hi1 \leq 0.96 \tag{5b}$$

$$0.72 \leq hm1/hi1 \leq 0.96 \tag{5c}$$

$$0.76 \leq hm1/hi1 \leq 0.96 \tag{5d}$$

Further, by appropriately determining the height at which the marginal rays of the on-axis beam enter the second optical element, the change in the apodization effect caused by the change in the in-focus distance can be further reduced. Therefore, the following conditional expression (6) is desirably satisfied.

$$0.85 \leq hm2/hi2 \leq 1.15 \tag{6}$$

In the conditional expression (6), hi2 denotes a distance from a position in which the marginal rays of the on-axis beam when focusing on infinity enter the second optical element to the optical axis OA. hm2 denotes a distance from a position in which the marginal rays of the on-axis beam when focusing on the closest focusing distance enter the second optical element to the optical axis OA.

The conditional expression (6) relates to a change at a position in which the marginal rays of the on-axis beam enter the second optical element caused by a change in the in-focus distance. As described above, the apodization effect in the on-axis beam is mainly provided by the second optical element. Therefore, it is desirable to provide the second optical element at a position in which the change in height of the on-axis beam caused by the change in the in-focus distance is small. If the second optical element is provided at a position in which the change in height of the on-axis beam caused by the change in the in-focus distance is large so that a value of hm2/hi2 exceeds an upper limit value and a lower limit value of the conditional expression (6), the change in the apodization effect on the on-axis beam caused by the change in the in-focus distance becomes larger.

A numerical value range of the conditional expression (6) is desirably set for Expression (6a) to Expression (6d) in this order.

$$0.88 \leq hm2/hi2 \leq 1.12 \quad (6a)$$

$$0.90 \leq hm2/hi2 \leq 1.10 \quad (6b)$$

$$0.92 \leq hm2/hi2 \leq 1.08 \quad (6c)$$

$$0.96 \leq hm2/hi2 \leq 1.04 \quad (6d)$$

The first optical element in the optical system of each embodiment respectively has transmittance distribution in which transmittance monotonically decreases in a direction perpendicular to the optical axis from an intersection of the first optical element and the optical axis. The second optical element in the optical system of each embodiment respectively has transmittance distribution in which transmittance monotonically decreases in a direction perpendicular to the optical axis from an intersection of the second optical element and the optical axis. Therefore, light quantity in an outer peripheral portion of a defocused image can be gradually reduced.

If the light quantity distribution is applied by the first optical element and the second optical element, an apparent size of the blurred image may become smaller. In particular, if transmittance distribution of the optical element having transmittance distribution is distribution in which transmittance decreases significantly from the center of the element, an apparent size of the blurred image tends to become smaller. Therefore, the first optical element of the optical system of each embodiment desirably satisfy the following conditional expression (7).

$$0.85 \leq Th1/T1 \quad (7)$$

In the conditional expression (7), Th1 denotes transmittance of the first optical element at a position in which a distance from the optical axis is hi1/2.

The conditional expression (7) relates to transmittance distribution of the first optical element in which an apparent size of the blurred image does not become excessively small, while the apodization effect is effectively obtained. By setting a value of Th1/T1 to be equal to or greater than a lower limit value of the conditional expression (7), transmittance of the first optical element in a range in which a distance from the optical axis is hi1/2 or less can be increased, and the apparent size of the blurred image is set so as not to be excessively small.

A numerical value range of the conditional expression (7) is desirably set for Expression (7a) to Expression (7d) in this order.

$$0.88 \leq Th1/T1 \quad (7a)$$

$$0.90 \leq Th1/T1 \quad (7b)$$

$$0.94 \leq Th1/T1 \quad (7c)$$

$$0.96 \leq Th1/T1 \quad (7d)$$

Similarly, the second optical element of the optical system of each embodiment desirably satisfies the following conditional expression (8).

$$0.85 \leq Th2/T2 \quad (8)$$

In the conditional expression (8), Th2 denotes transmittance of the second optical element at a position in which a distance from the optical axis is hi2/2.

The conditional expression (8) relates to transmittance distribution of the second optical element in which an apparent size of the blurred image does not become excessively small, while the apodization effect is effectively obtained. By setting a value of Th2/T2 to be equal to or greater than a lower limit value of the conditional expression (8), transmittance of the second optical element in a range in which a distance from the optical axis is hi2/2 or less can be increased, and the apparent size of the blurred image is set so as not to be excessively small.

A numerical value range of the conditional expression (8) is desirably set for Expression (8a) to Expression (8d) in this order.

$$0.88 \leq Th2/T2 \quad (8a)$$

$$0.90 \leq Th2/T2 \quad (8b)$$

$$0.94 \leq Th2/T2 \quad (8c)$$

$$0.96 \leq Th2/T2 \quad (8d)$$

If transmittance of the first optical element and transmittance of the second optical element have wavelength dependency, coloring may occur in the contour of the blurred image. Therefore, the first optical element and the second optical element in each embodiment desirably satisfy the following conditional expression (9) at a position in which transmittance in a wavelength of 550 nm is 50%.

$$(T\lambda max - T\lambda min)/T\lambda max \leq 0.20 \quad (9)$$

In the conditional expression (9), at the position in which transmittance in a wavelength of 550 nm is 50%, a maximum value of the transmittance of a wavelength band equal to or greater than 430 nm and equal to or less than 700 nm is defined as T$\lambda$max, and a minimum value of the transmittance of that wavelength band is defined as T$\lambda$min.

If the wavelength dependency of the transmittance is large to exceed the upper limit value of the conditional expression (9), coloring occurs in the contour of the blurred image. Therefore, when both the first optical element and the second optical element satisfy the conditional expression (9), occurrence of coloring in the contour of the blurred image can be reduced.

A numerical value range of the conditional expression (9) is desirably set for Expression (9a) to Expression (9d) in this order.

$$(T\lambda max - T\lambda min)/T\lambda max \leq 0.20 \quad (9a)$$

$$(T\lambda max - T\lambda min)/T\lambda max \leq 0.18 \quad (9b)$$

$$(T\lambda max - T\lambda min)/T\lambda max \leq 0.16 \quad (9c)$$

$$(T\lambda max - T\lambda min)/T\lambda max \leq 0.14 \quad (9d)$$

A half field angle $\omega$ of an image pickup lens desirably satisfies the following conditional expression (10).

$$8° \leq \omega \leq 56° \quad (10)$$

The conditional expression (10) relates to a half field angle of an image pickup lens. Light quantity distribution of a blurred image is formed corresponding to aberration of an optical system. In an image pickup optical system in which the value of $\omega$ is less than a lower limit value of the conditional expression (10), aberration which worsens the light quantity distribution of the blurred image is easily suppressed by design. Therefore, by providing light quantity distribution by the first optical element and the second optical element, an effect of improving an appearance of the blurred image is decreased. When the value of $\omega$ exceeds an upper limit value of the conditional expression (10), vignetting in the off-axis beam becomes larger, and it becomes difficult to provide equivalent light quantity distribution to the on-axis beam and to the off-axis beam.

A numerical value range of the conditional expression (10) is desirably set for Expression (10a) to Expression (10d) in this order.

$$8.4° \leq \omega \leq 52°$$ (10a)

$$8.8° \leq \omega \leq 48°$$ (10b)

$$9.0° \leq \omega \leq 45°$$ (10c)

In the optical system of each embodiment, the following conditional expression (11) is desirably satisfied.

$$0.25 \leq LF1/Lf$$ (11)

In the conditional expression (11), Lf denotes a distance from the aperture diaphragm SP to an optical surface closest to the object. LF1 denotes a distance on the optical axis OA from an optical surface of the first optical element closer to the aperture diaphragm SP to the aperture diaphragm SP.

The conditional expression (11) relates to an arrangement of the first optical element. If the value of LF1/Lf is less than a lower limit value of the conditional expression (11), the first optical element is disposed at a position relatively closer to the aperture diaphragm SP. However, in an optical system in which vignetting occurs, since a diameter of the off-axis beam is smaller than a diameter of the on-axis beam, it is difficult to provide sufficient light quantity distribution to the off-axis beam if the first optical element which satisfies the conditional expression (1) is provided at a position in which the value of LF1/Lf is less than the lower limit value of the conditional expression (11) is exceeded.

A numerical value range of the conditional expression (11) is desirably set for Expression (11a) to Expression (11d) in this order.

$$0.28 \leq LF1/Lf$$ (11a)

$$0.32 \leq LF1/Lf$$ (11b)

$$0.36 \leq LF1/Lf$$ (11c)

$$0.40 \leq LF1/Lf$$ (11d)

In the optical system of each embodiment, the following conditional expression (12) is desirably satisfied.

$$0.25 \leq LF2/Lr$$ (12)

In the conditional expression (12), Lr denotes a distance on the optical axis from the aperture diaphragm SP to an optical surface closest to the image plane. LF2 denotes a distance on the optical axis OA from an optical surface of the second optical element closer to the aperture diaphragm SP to the aperture diaphragm SP.

The conditional expression (12) relates to an arrangement of the second optical element. If the value of LF2/Lr is less than a lower limit value of the conditional expression (12), the second optical element is disposed at a position relatively closer to the aperture diaphragm SP. However, in an optical system in which vignetting occurs, a diameter of the off-axis beam is smaller than a diameter of the on-axis beam at close to the aperture diaphragm SP. Therefore, if the second optical element which satisfies the conditional expression (2) is provided at a position in which a lower limit value of the conditional expression (12) is exceeded, it becomes difficult to provide sufficient light quantity distribution to both the on-axis beam and the off-axis beam.

A numerical value range of the conditional expression (12) is desirably set for Expression (12a) to Expression (12d) in this order.

$$0.28 \leq LF2/Lr$$ (12a)

$$0.32 \leq LF2/Lr$$ (12b)

$$0.36 \leq LF2/Lr$$ (12c)

$$0.40 \leq LF2/Lr$$ (12d)

Next, the optical system of each embodiment will be described in more detail.

First Embodiment

Figure 2A:
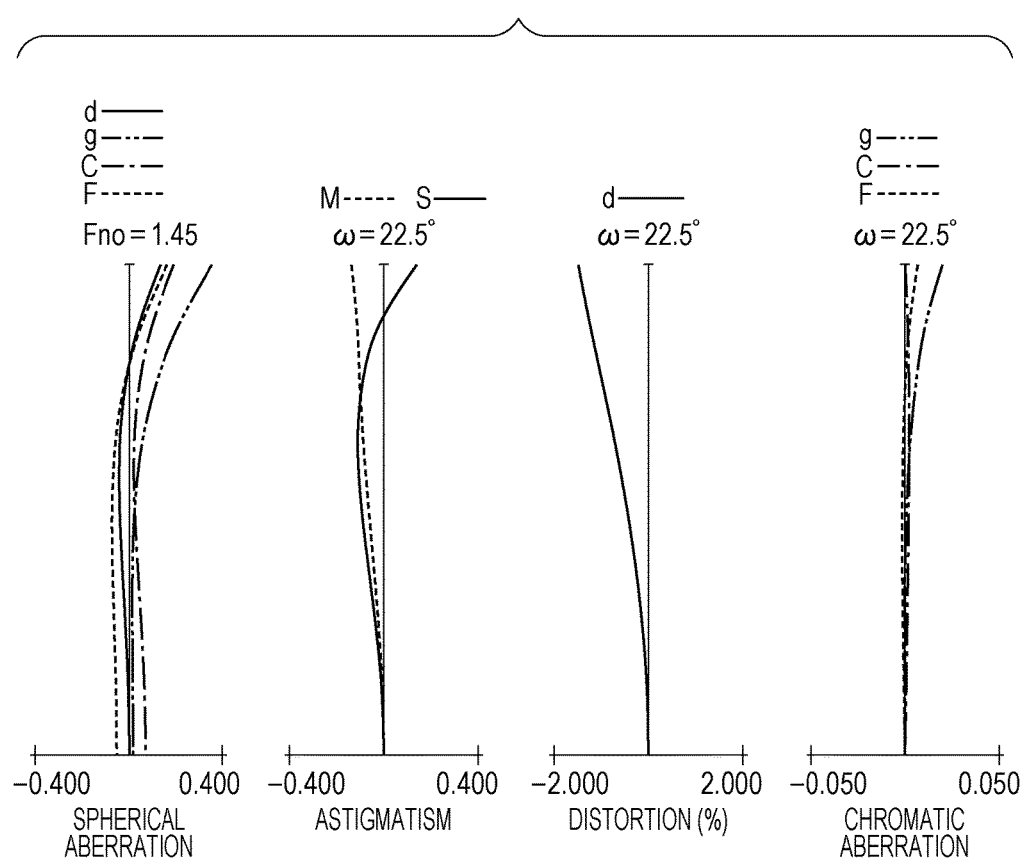
FIGS. 2A and 2B are aberration charts of the optical system of the first embodiment.
Figure 2B:
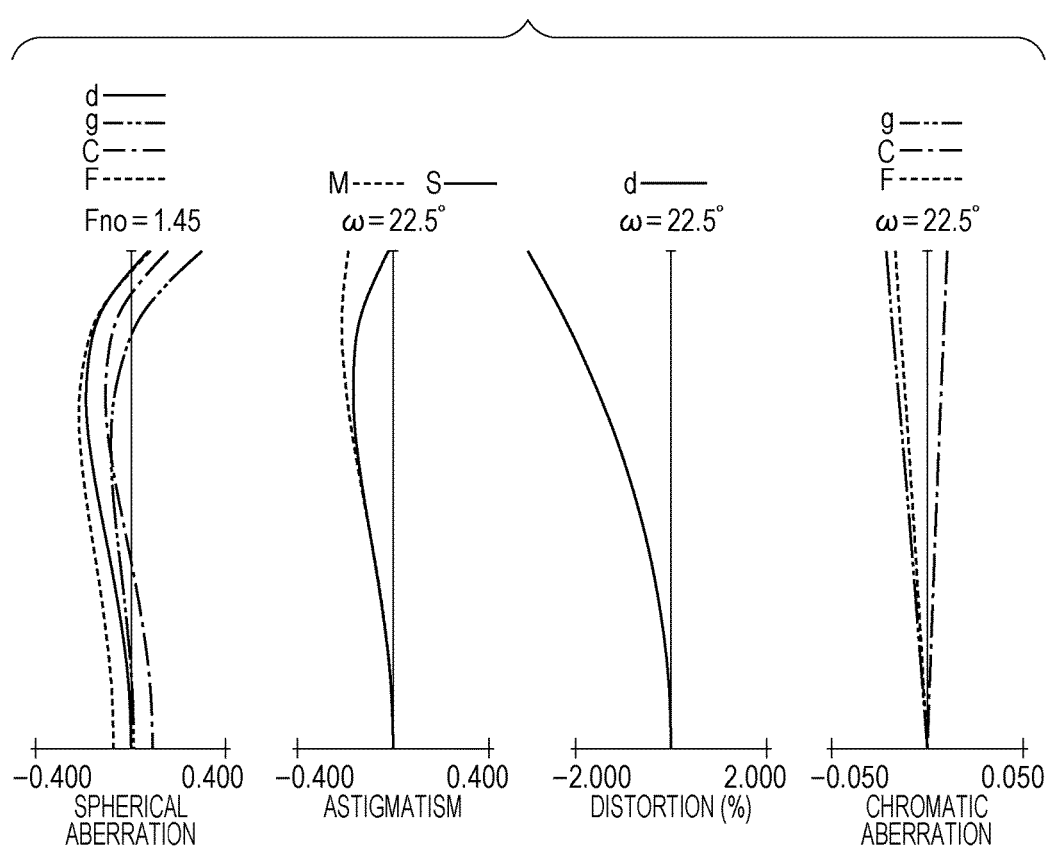

Cross-sectional views of the optical system 1 of the present embodiment are illustrated in FIGS. 1A and 1B. FIG. 2A is an aberration chart when the optical system 1 focuses on an object at infinity, and FIG. 2B is an aberration chart when the optical system 1 focuses on the closest focusing distance.

The optical system 1 of the present embodiment includes an optical system having positive refractive power disposed on the light incident side of the aperture diaphragm SP and an optical system having positive refractive power disposed on the light emission side of the aperture diaphragm SP. A first optical element 11 is a plate-shaped optical element disposed closest to the object (a first lens). Light absorbing thin film is provided on a flat surface on the object side of the plate-shaped optical element, and transmittance distribution is formed thereby.

A second optical element 12 is a seventh lens. Light absorbing thin film is provided on a curved surface on the image side of the seventh lens, and transmittance distribution is formed thereby. Both the transmittance of the first optical element 11 and the transmittance of the second optical element 12 monotonically decrease from the center to the periphery.

The optical system 1 can perform focusing from infinity to the closest focusing distance by moving the entire optical system as illustrated by an arrow in FIG. 1A.

In the aberration charts illustrated in FIGS. 2A and 2B, Fno denotes an F number and w denotes an image pickup half field angle. In an astigmatism diagram, S denotes astigmatism on a sagittal image plane, and M denotes astigmatism on a meridional image plane.

Although the optical system 1 of the present embodiment is a coaxial system in which a center of curvature of each optical surface and a center position of an image plane are disposed on the optical axis, the optical system 1 may be a non-coaxial system if necessary.

Second Embodiment

Figure 3A:
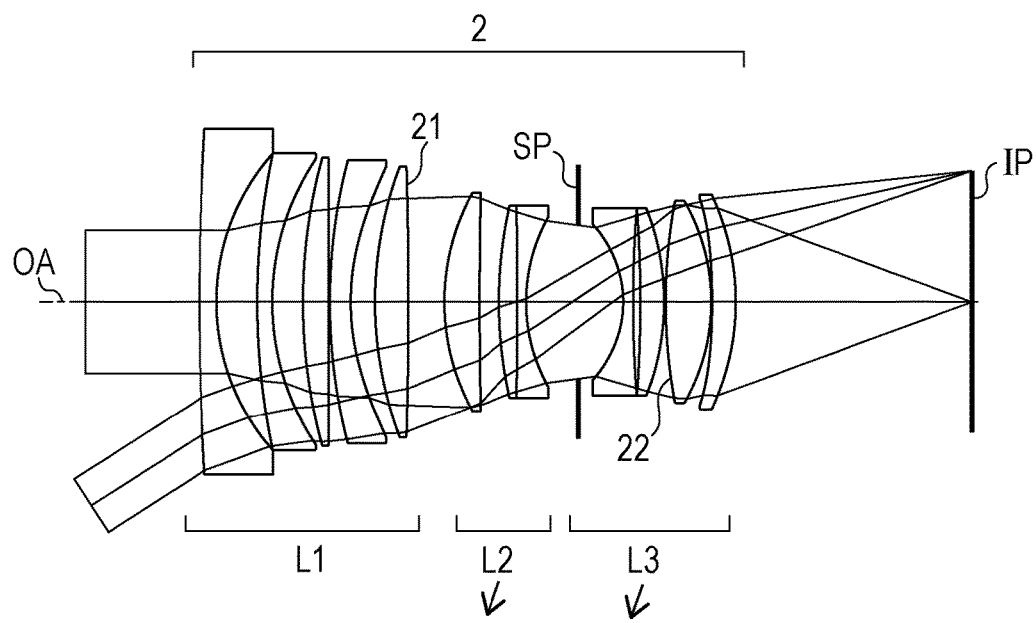
FIGS. 3A and 3B are cross-sectional views of an optical system of a second embodiment.
Figure 3B:
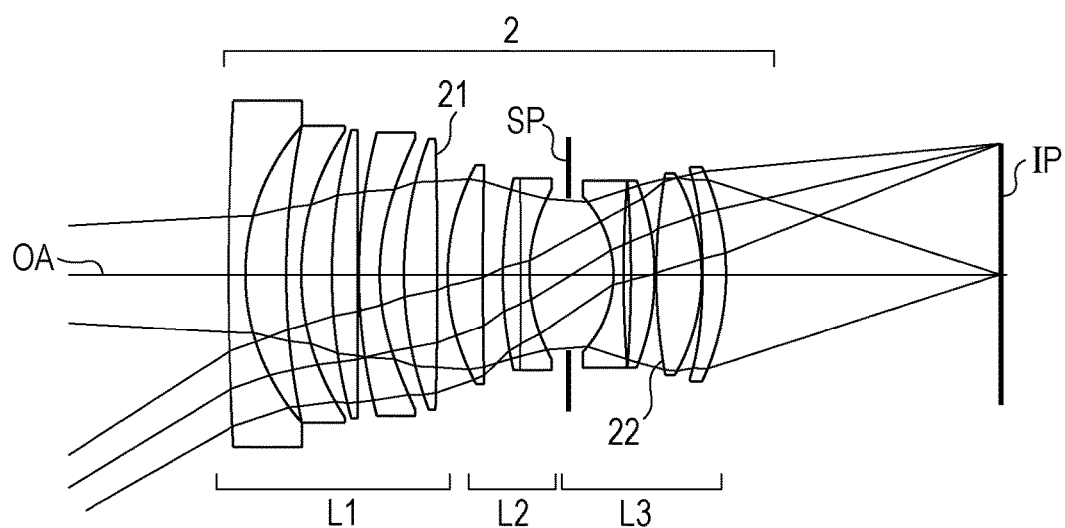
Figure 4A:
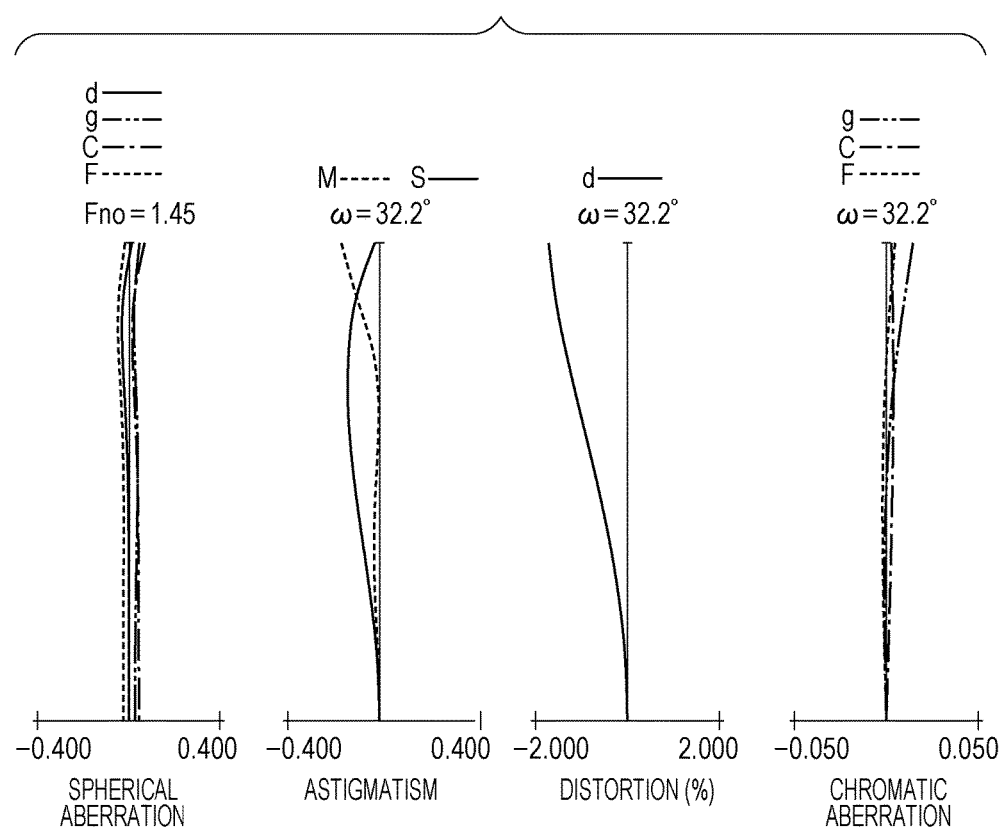
FIGS. 4A and 4B are aberration charts of the optical system of the second embodiment.
Figure 4B:
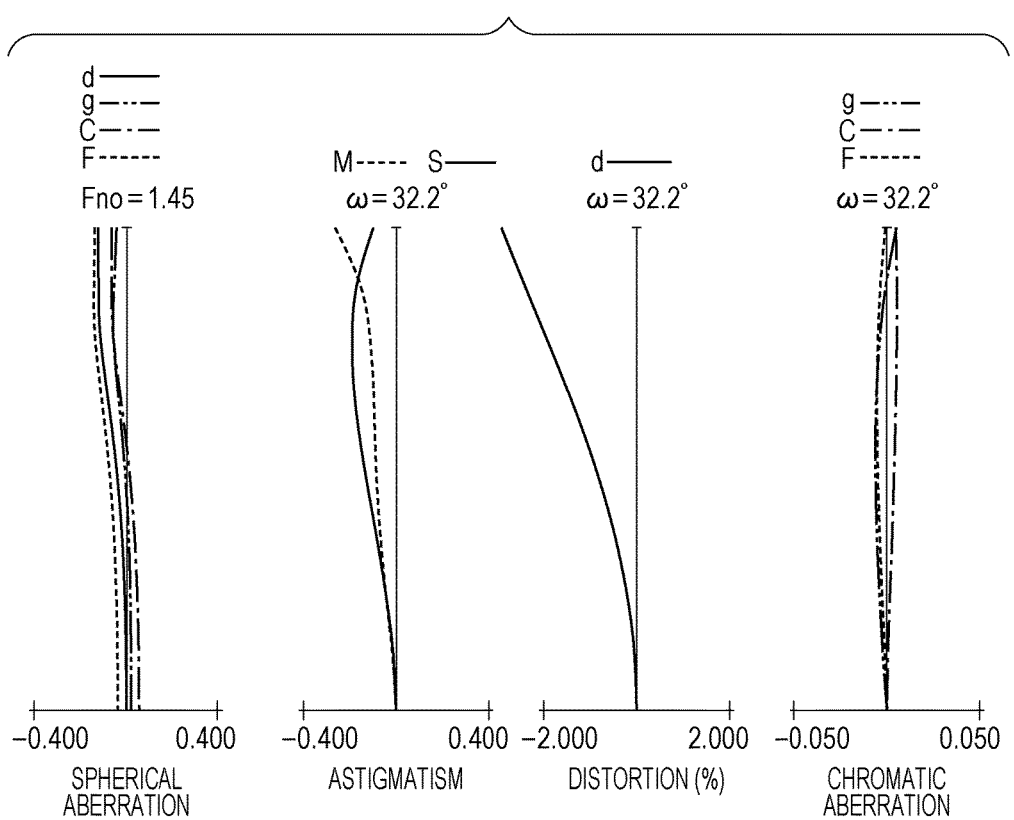

Cross-sectional views of an optical system 2 of the present embodiment are illustrated in FIGS. 3A and 3B. FIG. 4A is an aberration chart when the optical system 2 focuses on an object at infinity, and FIG. 4B is an aberration chart when the optical system 2 is focuses on the closest focusing distance.

The optical system 2 of the present embodiment includes a first lens unit L1 having negative refractive power, a second lens unit L2 having positive refractive power, and a third lens unit L3 having positive refractive power which includes an aperture diaphragm SP disposed in this order from the object side to the image side. The first lens unit L1 includes a first optical element 21, and the third lens unit L3 includes a second optical element 22.

The first optical element 21 is a fifth lens. Light absorbing thin film is provided on a curved surface on the image side of the fifth lens, and transmittance distribution is formed thereby. A second optical element 22 is a twelfth lens. Light absorbing thin film is provided on a curved surface on the object side of the twelfth lens, and transmittance distribution is formed thereby. Both the transmittance of the first optical element 21 and the transmittance of the second optical element 22 monotonically decrease from the center to the periphery.

The optical system 2 can perform focusing from infinity to the closest focusing distance by moving the second lens unit L2 and the third lens unit L3 as illustrated by arrows in FIG. 3A. During focusing, a distance between the second lens unit L2 and the third lens unit L3 changes, while the first lens unit L1 remains fixed.

Third Embodiment

Figure 5A:
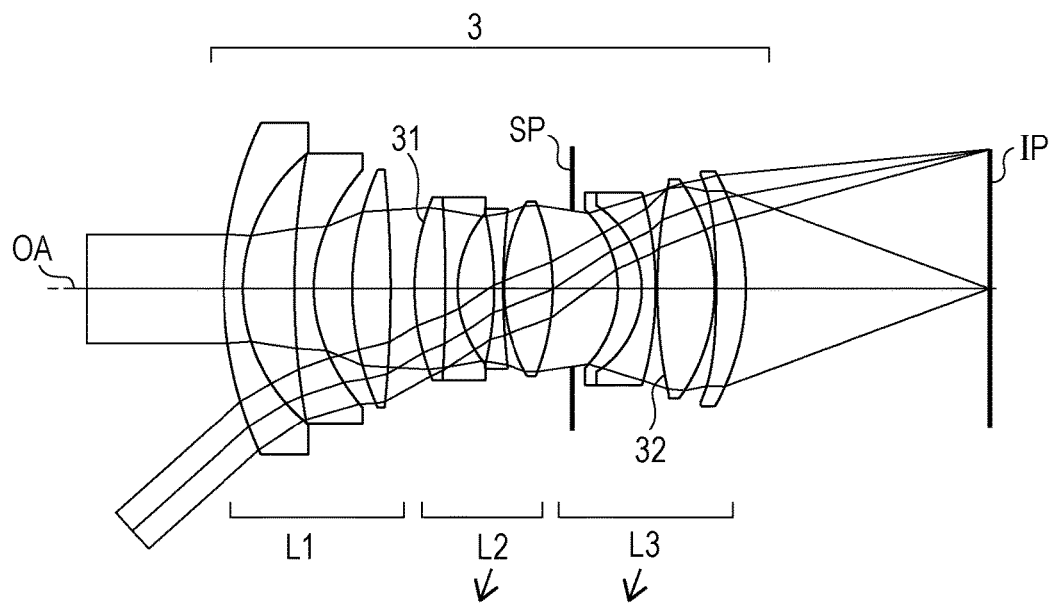
FIGS. 5A and 5B are cross-sectional views of an optical system of a third embodiment.
Figure 5B:
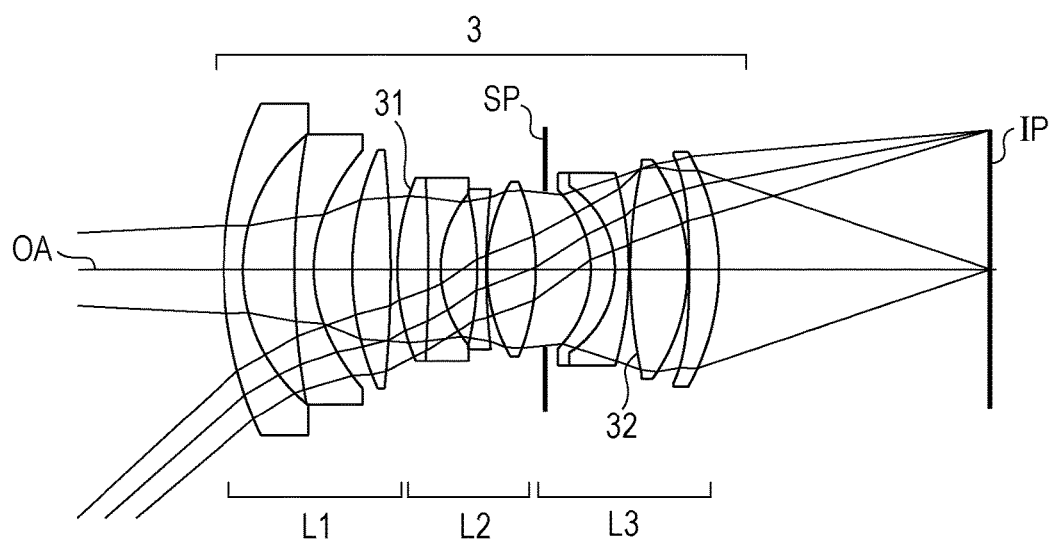
Figure 6A:
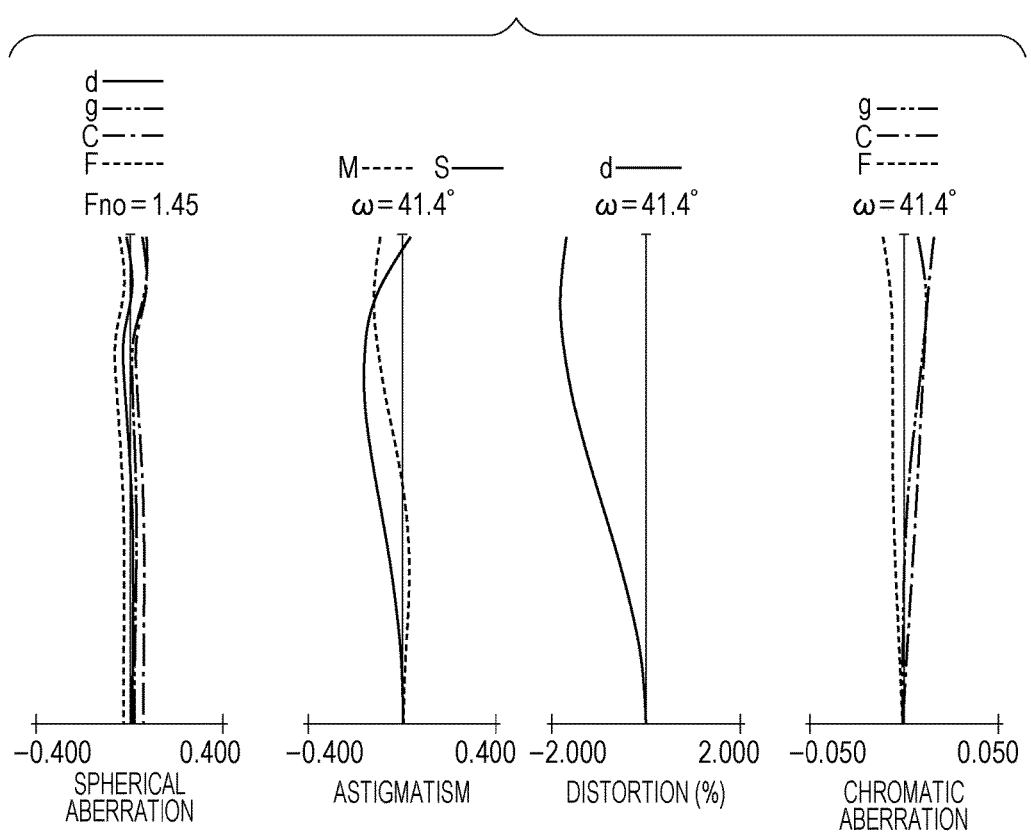

Cross-sectional view of an optical system 3 of the present embodiment are illustrated in FIGS. 5A and 5B. FIG. 6A is an aberration chart when the optical system 3 focuses on an object at infinity, and FIG. 6B is an aberration chart when the optical system 3 focuses on the closest focusing distance.

The optical system 3 of the present embodiment includes a first lens unit L1 having negative refractive power, a second lens unit L2 having positive refractive power, and a third lens unit L3 having positive refractive power which includes an aperture diaphragm SP disposed in this order from the object side to the image side. The second lens unit L2 includes a first optical element 31, and the third lens unit L3 includes a second optical element 32.

The first optical element 31 is a fourth lens. Light absorbing thin film is provided on a curved surface on the object side of the fourth lens, and transmittance distribution is formed thereby. A second optical element 32 is a tenth lens. Light absorbing thin film is provided on a curved surface on the object side of the tenth lens, and transmittance distribution is formed thereby. Both the transmittance of the first optical element 31 and the transmittance of the second optical element 32 monotonically decrease from the center to the periphery.

The optical system 3 can perform focusing from infinity to the closest focusing distance by moving the second lens unit L2 and the third lens unit L3 as illustrated by arrows in FIG. 5A. During focusing, a distance between the second lens unit L2 and the third lens unit L3 changes. During focusing, the first lens unit L1 is fixed.

Fourth Embodiment

Figure 8A:
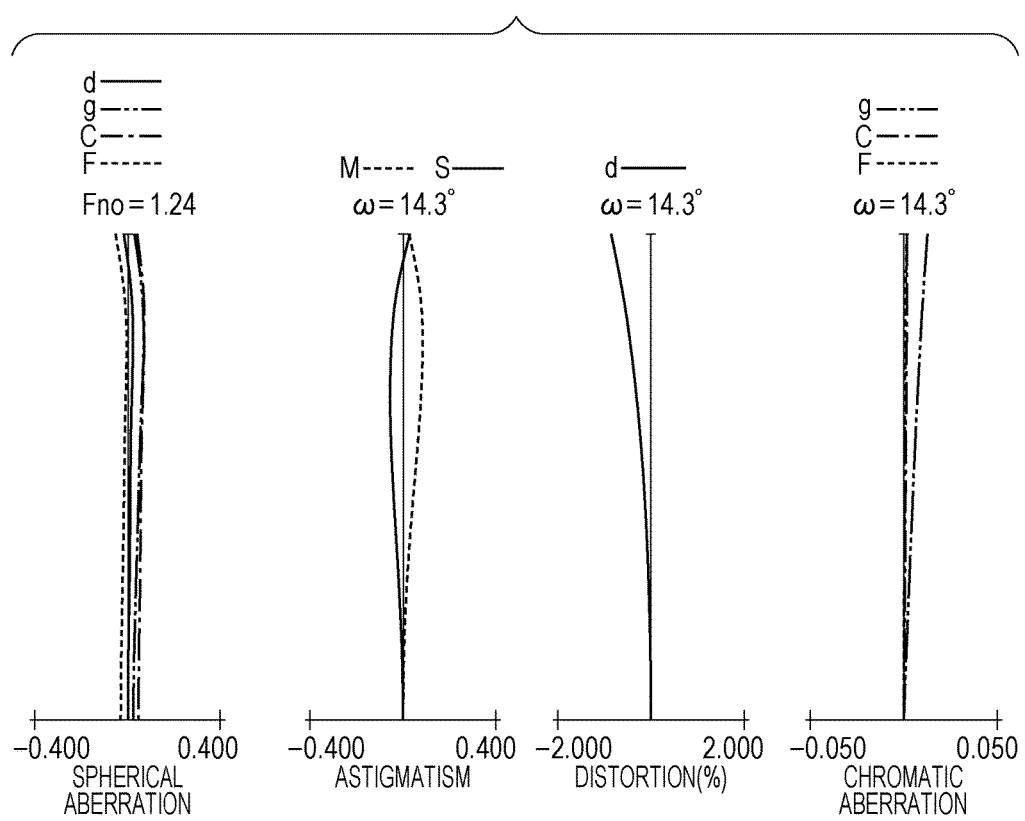
FIGS. 8A and 8B are aberration charts of the optical system of the fourth embodiment.
Figure 8B:
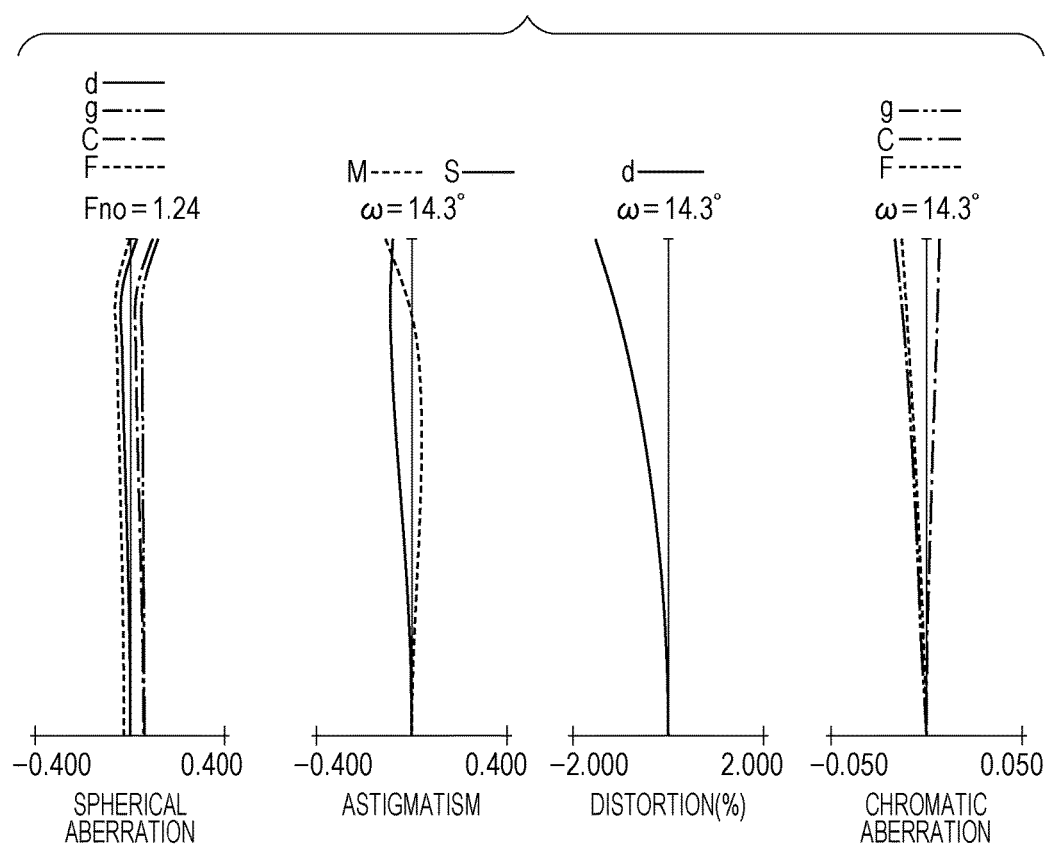

Cross-sectional view of an optical system 4 of the present embodiment are illustrated in FIGS. 7A and 7B. FIG. 8A is an aberration chart when the optical system 4 focuses on an object at infinity, and FIG. 8B is an aberration chart when the optical system 4 focuses on the closest focusing distance.

The optical system 4 of the present embodiment includes a first lens unit L1 having positive refractive power including an aperture diaphragm SP, and a second lens unit L2 having positive refractive power disposed in this order from the object side to the image side. The first lens unit L1 includes a first optical element 41 and a second optical element 42.

The first optical element 41 is a plate-shaped optical element disposed closest to the object (a first lens) in the optical system 4. Light absorbing thin film is provided on a flat surface on the image side of the plate-shaped optical element, and transmittance distribution is formed thereby.

A second optical element 42 is a tenth lens. Light absorbing thin film is provided on a curved surface on the image side of the tenth lens, and transmittance distribution is formed thereby. Both the transmittance of the first optical element 41 and the transmittance of the second optical element 42 monotonically decrease from the center to the periphery.

The optical system 4 can perform focusing from infinity to the closest focusing distance by moving the first lens unit L1 as illustrated by an arrow in FIG. 7A. During focusing, the second lens unit L2 is fixed.

Fifth Embodiment

Figure 9A:
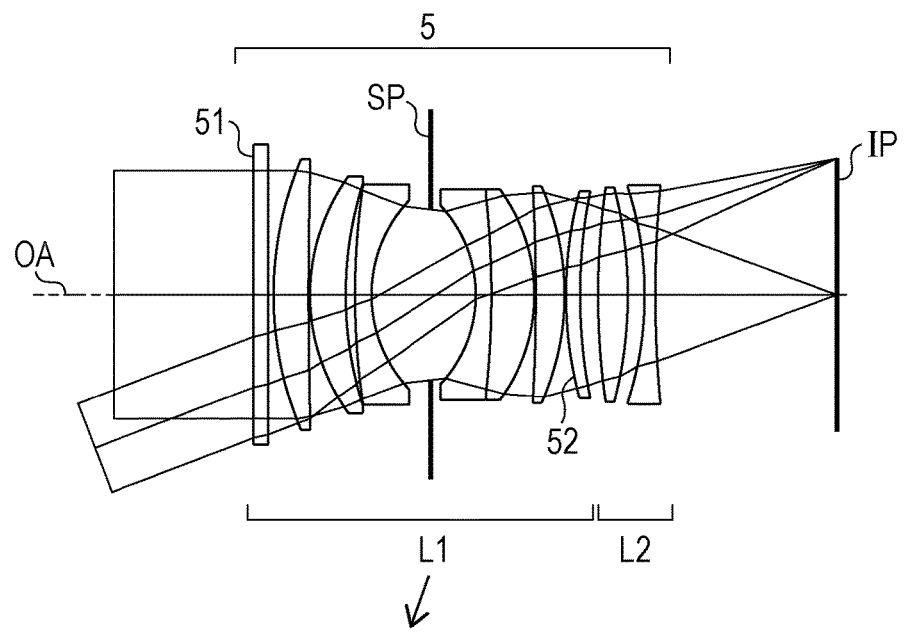
FIGS. 9A and 9B are cross-sectional views of an optical system of a fifth embodiment.
Figure 9B:
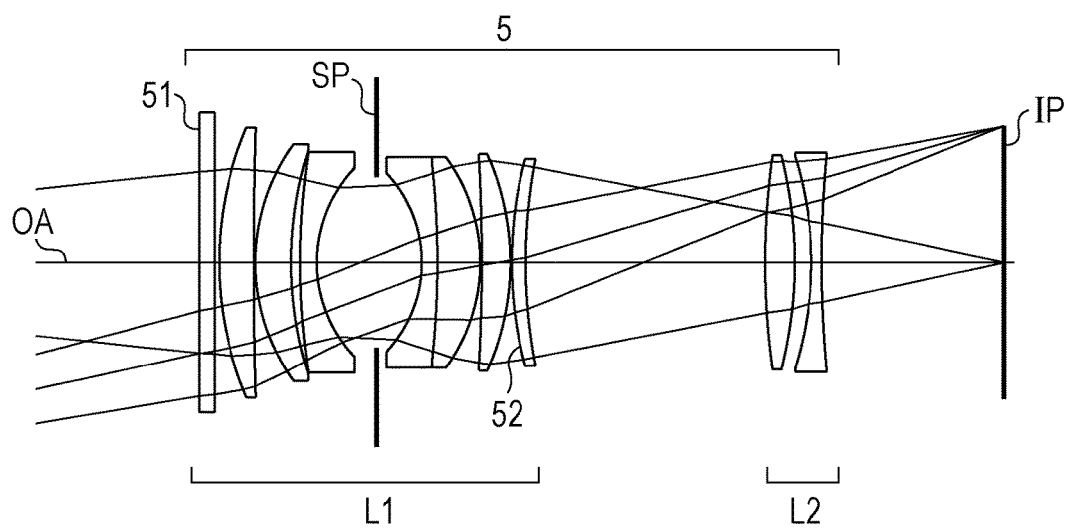
Figure 10A:
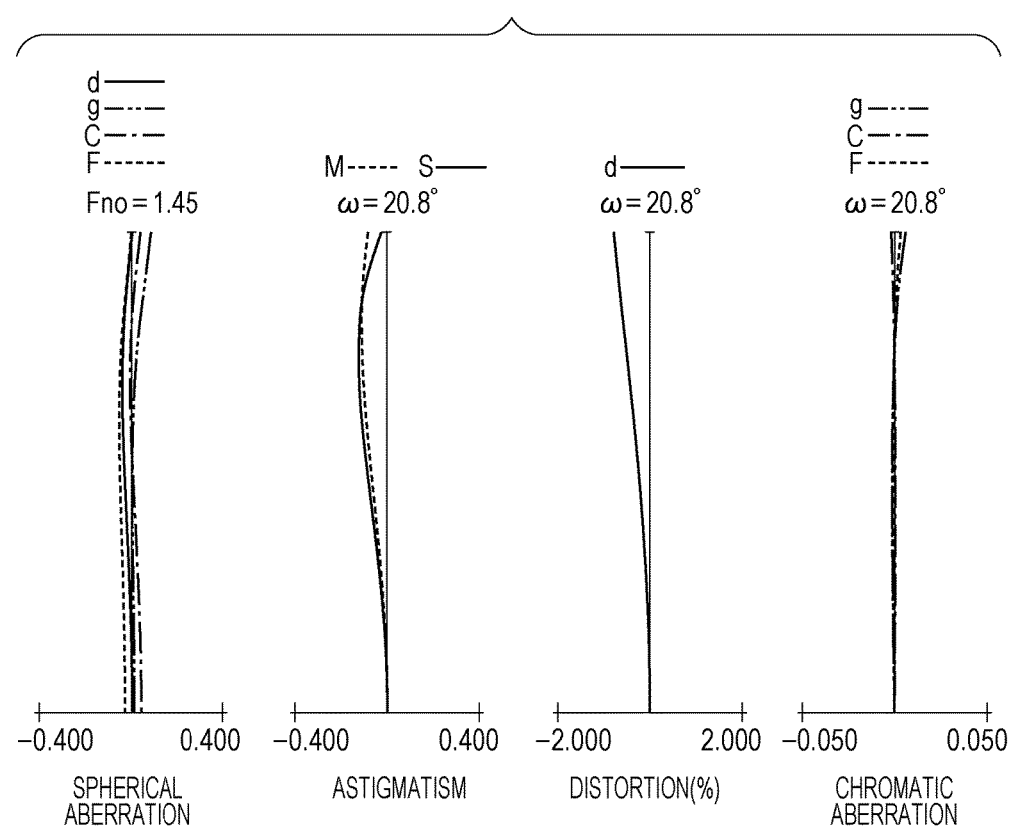
FIGS. 10A and 10B are aberration charts of the optical system of the fifth embodiment.
Figure 10B:
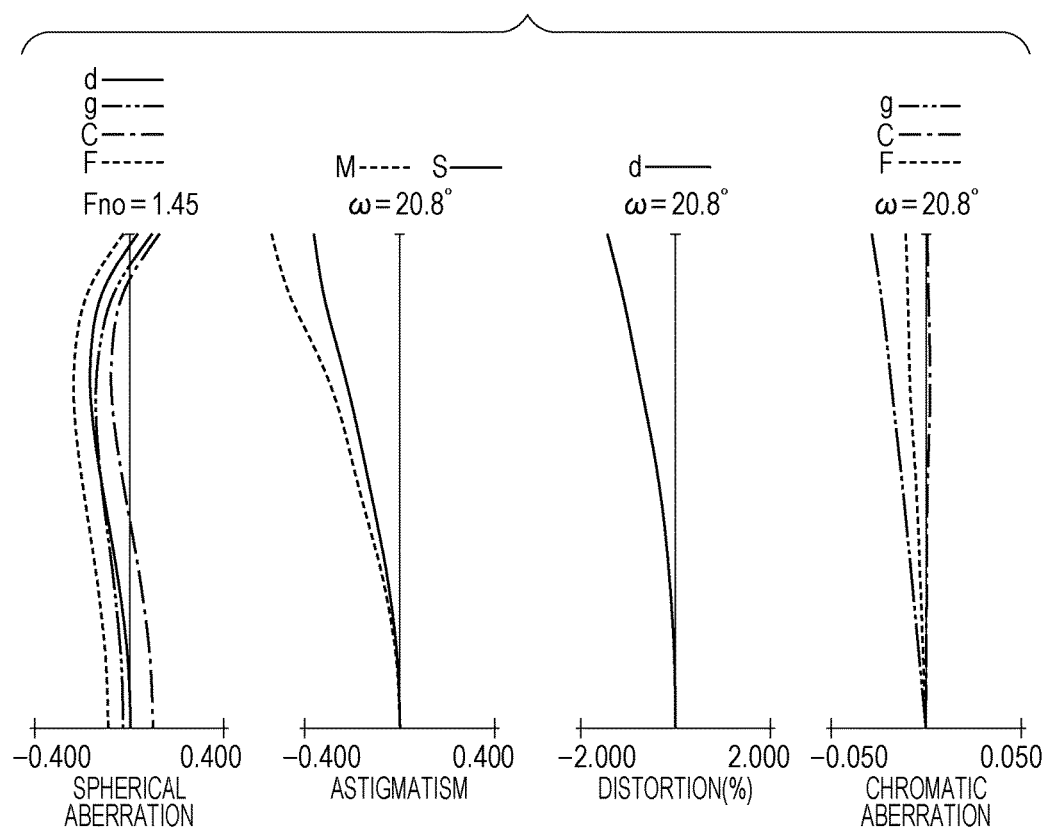

Cross-sectional view of an optical system 5 of the present embodiment are illustrated in FIGS. 9A and 9B. FIG. 10A is an aberration chart when the optical system 5 focuses on an object at infinity, and FIG. 10B is an aberration chart when the optical system 5 focuses on the closest focusing distance.

The optical system 5 of the present embodiment includes a first lens unit L1 having positive refractive power including an aperture diaphragm SP, and a second lens unit L2 having positive refractive power disposed in this order from the object side to the image side.

The first optical element 51 is a plate-shaped optical element disposed closest to the object (a first lens) in the optical system 5. Light absorbing thin film is provided on a flat surface on the object side of the plate-shaped optical element, and transmittance distribution is formed thereby.

A second optical element 52 is an eighth lens. Light absorbing thin film is provided on a curved surface on the object side of the eighth lens, and transmittance distribution is formed thereby. Both the transmittance of the first optical element 51 and the transmittance of the second optical element 52 monotonically decrease from the center to the periphery.

The optical system 5 can perform focusing from infinity to the closest focusing distance by moving the first lens unit L1 as illustrated by an arrow in FIG. 9A. During focusing, the second lens unit L2 is fixed.

Sixth Embodiment

Figure 11A:
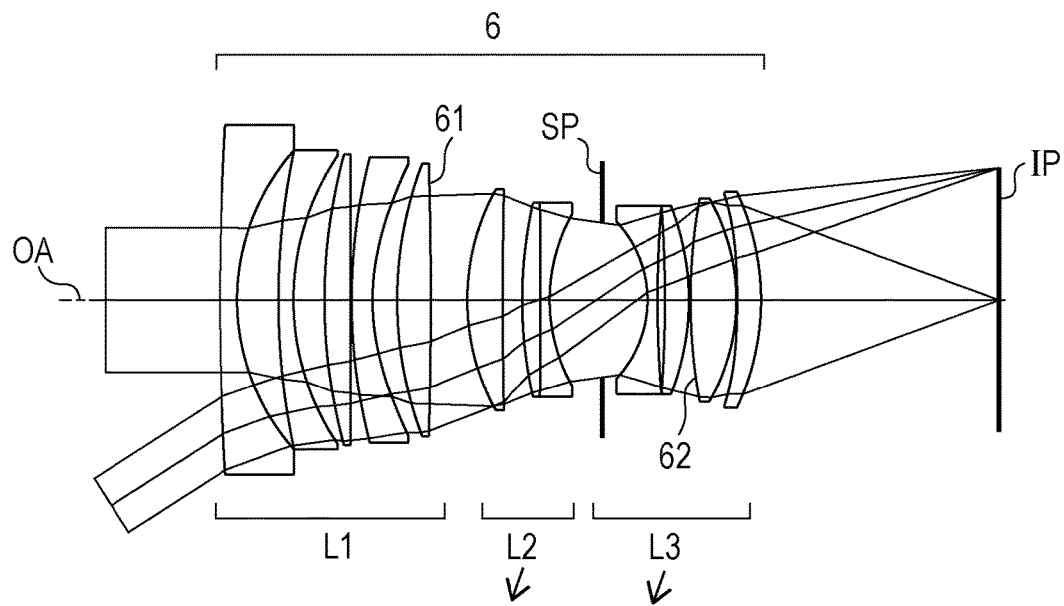
FIGS. 11A and 11B are cross-sectional views of an optical system of a sixth embodiment.
Figure 11B:
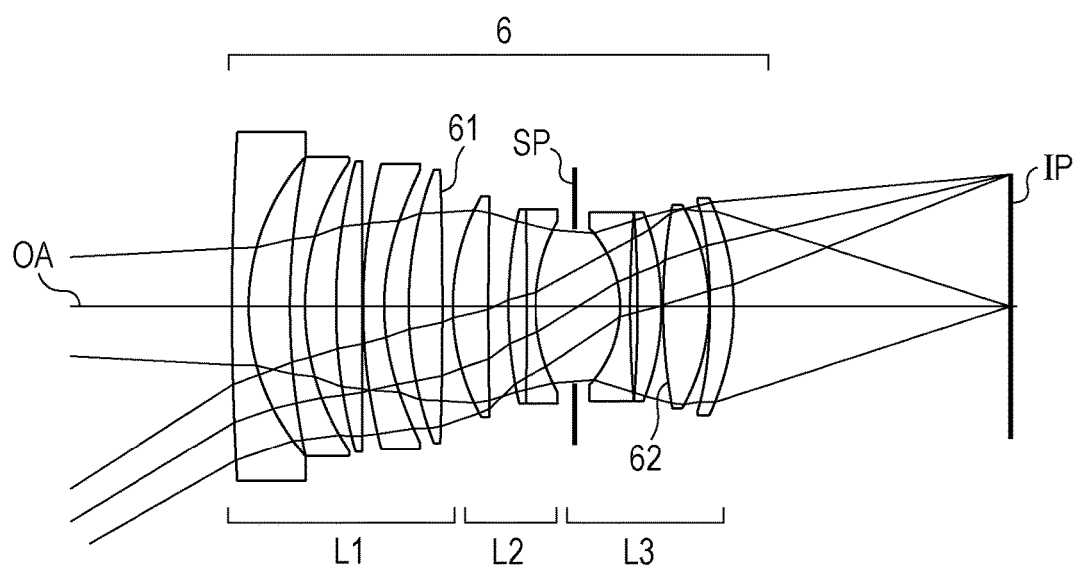
Figure 12A:
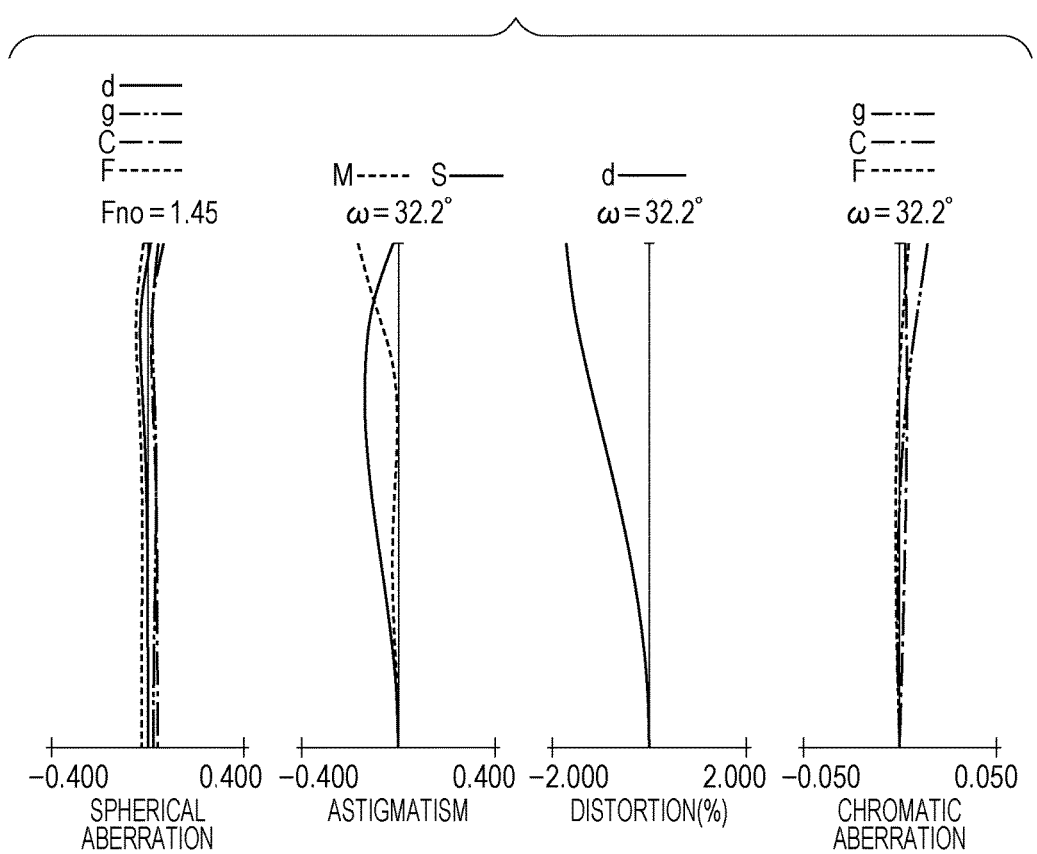
FIGS. 12A and 12B are aberration charts of the optical system of the sixth embodiment.
Figure 12B:
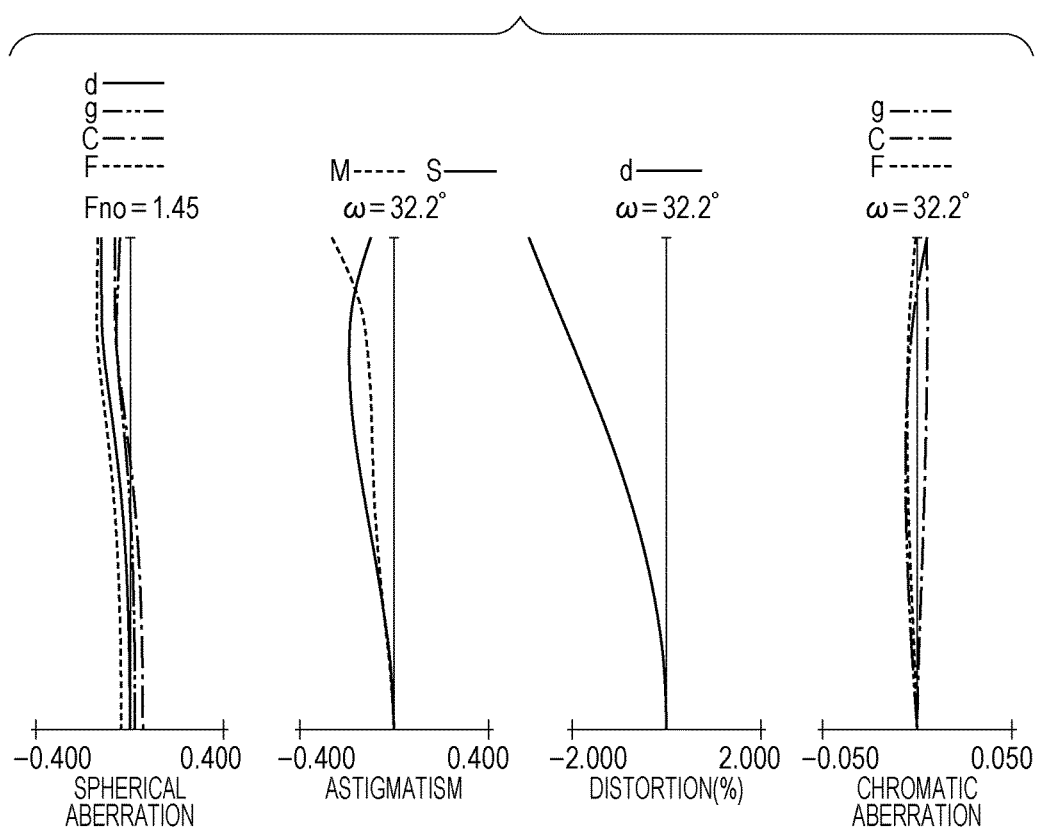

Cross-sectional view of an optical system 6 of the present embodiment are illustrated in FIGS. 11A and 11B. FIG. 12A is an aberration chart when the optical system 6 focuses on an object at infinity, and FIG. 12B is an aberration chart when the optical system 6 focuses on the closest focusing distance.

The optical system 6 related to the present embodiment is the same as the optical system 2 of the second embodiment except for the transmittance distribution in the first optical element 61 and the transmittance distribution of the second optical element 62.

Figure 13:
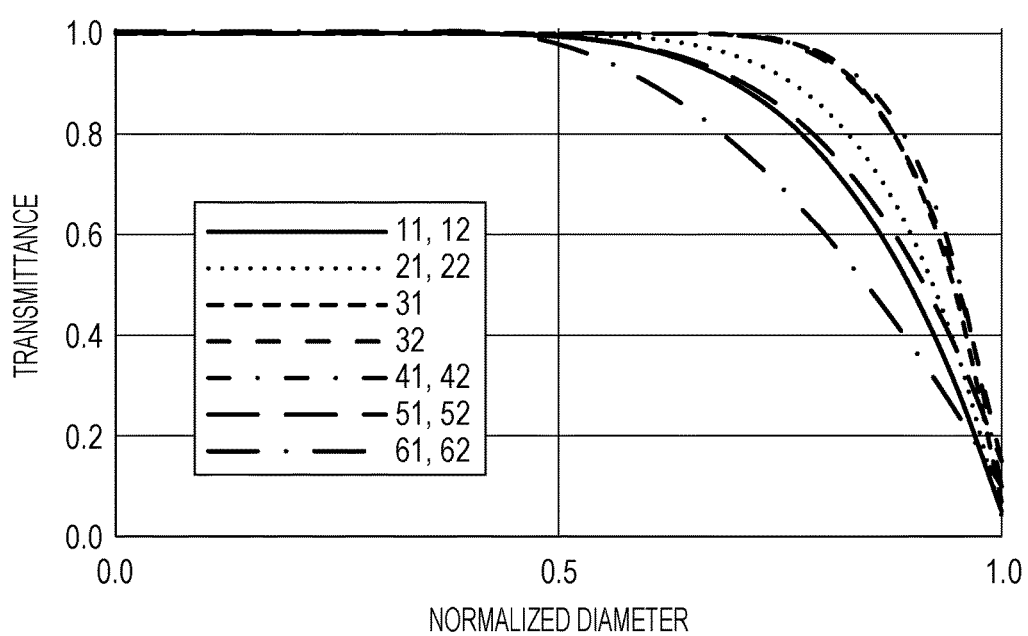
FIG. 13 is a diagram illustrating transmittance distribution of optical elements having transmittance distribution of each embodiment.

Transmittance distribution of the first optical element and transmittance distribution of the second optical element in each embodiment described above are illustrated in FIG. 13. A horizontal axis of FIG. 13 indicates a diameter normalized with an effective diameter in each optical element. A vertical axis of FIG. 13 indicates transmittance of each optical element.

Next, numerical embodiments 1 to 6 respectively corresponding to the first embodiment to the sixth embodiment described above will be provided. In each numerical embodiment, when m is defined as a surface number counted from the light incident side, dm denotes an on-axis distance (a distance on the optical axis) between an m-th surface and an (m+1)th surface. In surface data, r denotes a curvature radius of each optical surface, d denotes an on-axis distance (a distance on the optical axis) between an m-th surface and an (m+1)th surface. nd denotes a refractive index of the optical member with respect to the d-line, and vd denotes an Abbe number of the optical member.

The Abbe number νd is a value defined by the following Expression (13) when the refractive indices with respect to the F-line (486.1 nm), the d-line (587.6 nm), and the C-line (656.3 nm) of the Fraunhofer lines are defined as NF, Nd, and NC, respectively.

$$\nu d = (Nd-1)/(NF-NC) \quad (13)$$

Regarding an optical surface of an aspheric surface shape in each numerical embodiment, a reference symbol of * (asterisk) is added after the surface number. "e±P" in each aspheric surface coefficient means "×10$^{\pm P}$." The aspheric surface shape of the optical surface is expressed by the following Expression (14) when a displacement amount from a surface vertex in an optical axis direction is denoted by x, a height from the optical axis in a direction orthogonal to the optical axis direction is denoted by h, a paraxial radius of curvature is denoted by r, a conic constant is denoted by k, and aspheric surface coefficients are denoted by B, C, D, and E.

$$x = \frac{h^2/r}{1 + \sqrt{1-(1+k)(h/r)^2}} + Bh^4 + Ch^6 + Dh^8 + Eh^{10} \quad (14)$$

Numerical Embodiment 1 unit mm surface data

| surface number | r | d | nd | vd | effective diameter |
|---|---|---|---|---|---|
| 1 | ∞ | 2.00 | 1.51633 | 64.1 | 43.28 |
| 2 | ∞ | 1.00 | | | 42.22 |
| 3 | 52.473 | 5.50 | 1.77250 | 49.6 | 38.32 |
| 4 | 435.079 | 1.20 | | | 36.48 |
| 5 | 26.238 | 5.00 | 1.83481 | 42.7 | 32.04 |
| 6 | 43.542 | 1.20 | | | 29.98 |
| 7 | 73.396 | 2.00 | 1.64769 | 33.8 | 29.90 |
| 8 | 17.407 | 9.00 | | | 25.14 |
| 9 (diaphragm) | ∞ | 7.50 | | | 24.62 |
| 10 | −18.407 | 2.00 | 1.80518 | 25.4 | 24.19 |
| 11 | −1040.592 | 6.50 | 1.75700 | 47.8 | 28.35 |
| 12 | −27.092 | 0.20 | | | 29.77 |
| 13 | −161.527 | 4.50 | 1.88300 | 40.8 | 30.66 |
| 14 | −34.946 | 0.20 | | | 31.00 |
| 15 | 86.504 | 3.00 | 1.80400 | 46.6 | 30.74 |
| 16 | 279.227 | (variable) | | | 31.01 |
| image plane | ∞ | | | | | various types of data

| | | |
|---|---|---|
| focal length | | 52.13 |
| F number | | 1.45 |
| angle of view | | 22.54 |
| image height | | 21.64 |
| total lens length | | 88.51 |
| BF | | 37.71 |
| object distance | ∞ | 450 |
| focusing magnification | 0 | −0.15 |
| d16 | 37.71 | 45.52 |
| entrance pupil position | | 31.76 |
| exit pupil position | | −35.06 |
| front principal point position | | 46.54 |
| rear principal point position | | −14.41 | lens unit data

| unit | starting surface | focal length | lens structure length | front principal point position | rear principal point position |
|---|---|---|---|---|---|
| 1 | 1 | 52.13 | 50.80 | 46.54 | −14.41 | single lens data

| lens | starting surface | focal length |
|---|---|---|
| 1 | 1 | ∞ |
| 2 | 3 | 76.76 |
| 3 | 5 | 69.90 |
| 4 | 7 | −35.73 |
| 5 | 10 | −23.29 |
| 6 | 11 | 36.64 |
| 7 | 13 | 49.67 |
| 8 | 15 | 154.81 |

Numerical Embodiment 2 unit mm surface data

| surface number | r | d | nd | vd | effective diameter |
|---|---|---|---|---|---|
| 1 | 480.322 | 2.82 | 1.67270 | 32.1 | 55.79 |
| 2 | 36.983 | 6.74 | | | 47.80 |
| 3 | 119.552 | 2.46 | 1.51742 | 52.4 | 47.72 |
| 4 | 42.361 | 5.06 | | | 45.90 |
| 5 | 90.295 | 4.27 | 1.90366 | 31.3 | 46.24 |
| 6 | −18601.026 | 0.15 | | | 46.10 |
| 7 | 93.603 | 3.43 | 1.58313 | 59.4 | 45.43 |
| 8* | 39.044 | 4.01 | | | 43.41 |
| 9 | 62.996 | 5.50 | 1.91082 | 35.3 | 43.38 |
| 10 | −756.556 | (variable) | | | 42.91 |
| 11 | 37.467 | 5.79 | 1.83481 | 42.7 | 34.86 |
| 12 | 779.999 | 3.27 | | | 34.14 |
| 13 | 72.301 | 2.99 | 1.59522 | 67.7 | 30.47 |
| 14 | −1236.876 | 1.50 | 1.72825 | 28.5 | 29.64 |
| 15 | 28.912 | (variable) | | | 26.78 |
| 16 (diaphragm) | ∞ | 7.36 | | | 25.30 |
| 17 | −18.879 | 1.64 | 1.84666 | 23.8 | 24.50 |
| 18 | 197.444 | 1.21 | 1.69934 | 26.4 | 28.47 |
| 19 | −209.968 | 3.90 | 1.91082 | 35.3 | 28.61 |
| 20 | −42.029 | 0.27 | | | 29.63 |
| 21 | 92.376 | 7.48 | 1.59522 | 67.7 | 31.68 |
| 22 | −33.657 | 0.15 | | | 32.00 |
| 23* | −106.635 | 3.88 | 1.85400 | 40.4 | 33.05 |
| 24 | −41.586 | (variable) | | | 34.12 |
| image plane | ∞ | | | | | aspheric surface data

8th surface

K = 0.00000e+000  B = −3.29635e−006  C = −1.06088e−009
D = −8.09890e−012  E = 1.33588e−014  F = −9.49240e−018

23rd surface

K = 0.00000e+000  B = −6.98994e−006  C = −7.36799e−010
D = −7.33127e−012  E = 6.43354e−015 various types of data

| | |
|---|---|
| focal length | 34.30 |
| F number | 1.45 |
| angle of view | 32.24 |

-continued unit mm

| | | |
|---|---|---|
| image height | | 21.64 |
| total lens length | | 127.48 |
| BF | | 39.05 |
| object distance | ∞ | 300 |
| focusing magnification | 0 | −0.18 |
| d10 | 5.93 | 1.70 |
| d15 | 8.60 | 6.48 |
| d24 | 39.05 | 45.40 |
| entrance pupil position | | 34.66 |
| exit pupil position | | −43.12 |
| front principal point position | | 54.64 |
| rear principal point position | | 4.75 | lens unit data

| unit | starting surface | focal length | lens structure length | front principal point position | rear principal point position |
|---|---|---|---|---|---|
| 1 | 1 | −396.15 | 34.44 | −96.68 | −163.46 |
| 2 | 11 | 116.60 | 13.56 | −20.89 | −25.39 |
| 3 | 16 | 42.30 | 25.90 | 23.59 | 10.19 | single lens data

| lens | starting surface | focal length |
|---|---|---|
| 1 | 1 | −59.72 |
| 2 | 3 | −128.19 |
| 3 | 5 | 99.45 |
| 4 | 7 | −117.60 |
| 5 | 9 | 64.05 |
| 6 | 11 | 46.98 |
| 7 | 13 | 114.86 |
| 8 | 14 | −38.77 |
| 9 | 17 | −20.28 |
| 10 | 18 | 145.68 |
| 11 | 19 | 57.06 |
| 12 | 21 | 42.38 |
| 13 | 23 | 77.69 |

Numerical Embodiment 3 unit mm surface data

| surface number | r | d | nd | vd | effective diameter |
|---|---|---|---|---|---|
| 1 | 60.645 | 2.99 | 1.83481 | 42.7 | 50.29 |
| 2 | 27.012 | 8.00 | | | 40.97 |
| 3 | 117.341 | 3.00 | 1.58313 | 59.4 | 40.70 |
| 4* | 23.272 | 5.95 | | | 35.84 |
| 5 | 45.007 | 5.97 | 1.88300 | 40.8 | 35.69 |
| 6 | −181.809 | (variable) | | | 35.07 |
| 7 | 37.305 | 4.80 | 1.83481 | 42.7 | 27.16 |
| 8 | −220.690 | 1.90 | 1.49700 | 81.5 | 25.35 |
| 9 | 18.219 | 5.66 | | | 22.44 |
| 10 | −50.884 | 1.40 | 1.65412 | 39.7 | 22.57 |
| 11 | 108.422 | 0.15 | | | 23.67 |
| 12 | 27.172 | 7.64 | 1.49700 | 81.5 | 25.70 |
| 13 | −35.855 | (variable) | | | 25.82 |
| 14 (diaphragm) | ∞ | 7.09 | | | 24.20 |
| 15 | −17.372 | 3.73 | 1.80400 | 46.6 | 23.44 |
| 16 | −15.383 | 2.15 | 1.80518 | 25.4 | 24.69 |
| 17 | −54.381 | 0.25 | | | 28.62 |
| 18 | 77.012 | 8.89 | 1.59240 | 68.3 | 31.17 |
| 19 | −29.139 | 0.25 | | | 32.76 |
| 20* | −146.547 | 4.60 | 1.80400 | 46.6 | 33.91 |
| 21 | −37.218 | (variable) | | | 35.21 |
| image plane | ∞ | | | | | aspheric surface data

4th surface

K = 0.00000e+000 B = −7.07218e−006 C = −1.52849e−008
D = 1.49643e−011 E = −7.71857e−014

20th surface

K = 0.00000e+000 B = −1.18658e−005 C = −2.84003e−009
D = −1.17097e−011 E = −7.45942e−015 various types of data

| | |
|---|---|
| focal length | 24.55 |
| F number | 1.45 |
| angle of view | 41.39 |
| image height | 21.64 |
| total lens length | 119.13 |
| BF | 38.01 |
| object distance | ∞ 250 |
| focusing magnification | 0 −0.16 |
| d 6 | 3.69 1.06 |
| d13 | 3.00 1.45 |
| d21 | 38.01 42.20 |
| entrance pupil position | 27.73 |
| exit pupil position | −52.69 |
| front principal point position | 45.64 |
| rear principal point position | 13.46 | lens unit data

| unit | starting surface | focal length | lens structure length | front principal point position | rear principal point position |
|---|---|---|---|---|---|
| 1 | 1 | −176.09 | 25.92 | −34.51 | −70.99 |
| 2 | 7 | 86.22 | 21.55 | 12.33 | −5.36 |
| 3 | 14 | 38.45 | 26.96 | 23.91 | 10.56 | single lens data

| lens | starting surface | focal length |
|---|---|---|
| 1 | 1 | −60.81 |
| 2 | 3 | −50.37 |
| 3 | 5 | 41.37 |
| 4 | 7 | 38.55 |
| 5 | 8 | −33.77 |
| 6 | 10 | −52.76 |
| 7 | 12 | 32.41 |
| 8 | 15 | 91.08 |
| 9 | 16 | −27.31 |
| 10 | 18 | 36.83 |
| 11 | 20 | 60.91 |

Numerical Embodiment 4 unit mm surface data

| surface number | r | d | nd | vd | effective diameter |
|---|---|---|---|---|---|
| 1 | ∞ | 2.00 | 1.51633 | 64.1 | 74.24 |
| 2 | ∞ | 2.00 | | | 73.57 |
| 3 | 121.371 | 3.33 | 1.84666 | 23.9 | 69.90 |
| 4 | 222.042 | 0.22 | | | 69.40 |

-continued unit mm

| | | | | | |
|---|---|---|---|---|---|
| 5* | 69.664 | 9.90 | 1.49700 | 81.5 | 67.01 |
| 6 | −77761.066 | 0.15 | | | 66.12 |
| 7 | 40.105 | 12.21 | 1.59522 | 67.7 | 57.56 |
| 8 | 159.244 | 2.89 | 1.72047 | 34.7 | 54.84 |
| 9 | 30.350 | 6.08 | | | 44.15 |
| 10 | 67.763 | 6.76 | 1.77250 | 49.6 | 44.05 |
| 11 | −692.244 | 3.65 | 1.72047 | 34.7 | 42.49 |
| 12 | 33.652 | 8.02 | | | 36.93 |
| 13 (diaphragm) | ∞ | 7.85 | | | 36.66 |
| 14 | −35.775 | 1.95 | 1.67270 | 32.1 | 36.34 |
| 15 | 63.478 | 10.17 | 1.88100 | 40.1 | 40.37 |
| 16 | −50.818 | 0.15 | | | 41.05 |
| 17 | 247.394 | 4.15 | 1.85400 | 40.4 | 39.60 |
| 18* | −137.022 | (variable) | | | 39.17 |
| 19 | 257.380 | 2.03 | 1.71736 | 29.5 | 39.76 |
| 20 | 74.361 | 3.50 | 1.88100 | 40.1 | 40.02 |
| 21 | 602.285 | 39.70 | | | 40.04 |
| image plane | ∞ | | | | | aspheric surface data

5th surface

K = −6.46456e−001 B = −1.63519e−007 C = −2.76686e−011
D = −4.93289e−014 E = 1.00681e−017

18th surface

K = 7.88575e+000 B = 3.04672e−007 C = 3.32275e−010
D = −1.04662e−012 E = 1.27587e−015 various types of data

| | | |
|---|---|---|
| focal length | | 85.00 |
| F number | | 1.24 |
| angle of view | | 14.28 |
| image height | | 21.64 |
| total lens length | | 127.50 |
| BF | | 39.70 |
| object distance | ∞ | 950 |
| focusing magnification | 0 | −0.11 |
| d18 | 0.80 | 14.01 |
| entrance pupil position | | 85.22 |
| exit pupil position | | −30.98 |
| front principal point position | | 68.01 |
| rear principal point position | | −45.30 | lens unit data

| unit | starting surface | focal length | lens structure length | front principal point position | rear principal point position |
|---|---|---|---|---|---|
| 1 | 1 | 100.35 | 81.48 | 53.19 | −49.01 |
| 2 | 19 | 282.80 | 5.52 | −0.52 | −3.55 | single lens data

| lens | starting surface | focal length |
|---|---|---|
| 1 | 1 | ∞ |
| 2 | 3 | 311.46 |
| 3 | 5 | 140.05 |
| 4 | 7 | 86.74 |
| 5 | 8 | −52.54 |
| 6 | 10 | 80.21 |
| 7 | 11 | −44.45 |
| 8 | 14 | −33.75 |
| 9 | 15 | 33.43 |
| 10 | 17 | 103.77 |
| 11 | 19 | −146.45 |
| 12 | 20 | 96.00 |

Numerical Embodiment 5 unit mm surface data

| surface number | r | d | nd | vd | effective diameter |
|---|---|---|---|---|---|
| 1 | ∞ | 1.50 | 1.51633 | 64.1 | 28.82 |
| 2 | ∞ | 0.50 | | | 28.09 |
| 3 | 34.866 | 3.50 | 1.77250 | 49.6 | 25.82 |
| 4 | 480.762 | 0.15 | | | 24.89 |
| 5 | 20.295 | 3.58 | 1.83481 | 42.7 | 22.58 |
| 6 | 37.308 | 0.92 | | | 21.09 |
| 7 | 74.198 | 1.65 | 1.68893 | 31.1 | 20.93 |
| 8 | 13.790 | 5.97 | | | 17.75 |
| 9 (diaphragm) | ∞ | 4.54 | | | 17.11 |
| 10 | −13.103 | 1.56 | 1.72825 | 28.5 | 16.76 |
| 11 | −90.888 | 4.29 | 1.59282 | 68.6 | 18.95 |
| 12 | −17.956 | 0.15 | | | 19.94 |
| 13 | −195.138 | 2.88 | 1.88300 | 40.8 | 20.38 |
| 14 | −26.616 | 0.15 | | | 20.52 |
| 15 | 40.874 | 1.41 | 1.80400 | 46.6 | 19.49 |
| 16 | 53.620 | (variable) | | | 19.55 |
| 17 | 77.083 | 2.97 | 1.58913 | 61.1 | 20.17 |
| 18 | −43.430 | 1.69 | | | 20.33 |
| 19 | −35.296 | 1.06 | 1.53172 | 48.8 | 20.25 |
| 20 | 117.415 | 18.30 | | | 20.77 |
| image plane | ∞ | | | | | various types of data

| | | |
|---|---|---|
| focal length | | 36.04 |
| F number | | 1.4 |
| angle of view | | 20.76 |
| image height | | 13.66 |
| total lens length | | 58.58 |
| BF | | 18.30 |
| object distance | ∞ | 166.4 |
| focusing magnification | 0 | −0.50 |
| d16 | 1.80 | 23.99 |
| entrance pupil position | | 20.76 |
| exit pupil position | | −23.86 |
| front principal point position | | 26.00 |
| rear principal point position | | −17.74 | lens unit data

| unit | starting surface | focal length | lens structure length | front principal point position | rear principal point position |
|---|---|---|---|---|---|
| 1 | 1 | 40.00 | 32.75 | 26.45 | −12.24 |
| 2 | 17 | 413.62 | 5.72 | −19.34 | −22.52 | single lens data

| lens | starting surface | focal length |
|---|---|---|
| 1 | 1 | ∞ |
| 2 | 3 | 48.50 |
| 3 | 5 | 48.66 |
| 4 | 7 | −24.86 |
| 5 | 10 | −21.20 |
| 6 | 11 | 36.94 |
| 7 | 13 | 34.63 |
| 8 | 15 | 203.83 |
| 9 | 17 | 47.59 |
| 10 | 19 | −50.92 |

Numerical Embodiment 6 unit mm surface data

| surface number | r | d | nd | vd | effective diameter |
|---|---|---|---|---|---|
| 1 | 480.322 | 2.82 | 1.67270 | 32.1 | 55.79 |
| 2 | 36.983 | 6.74 | | | 47.80 |
| 3 | 119.552 | 2.46 | 1.51742 | 52.4 | 47.72 |
| 4 | 42.361 | 5.06 | | | 45.90 |
| 5 | 90.295 | 4.27 | 1.90366 | 31.3 | 46.24 |
| 6 | −18601.026 | 0.15 | | | 46.10 |
| 7 | 93.603 | 3.43 | 1.58313 | 59.4 | 45.43 |
| 8* | 39.044 | 4.01 | | | 43.41 |
| 9 | 62.996 | 5.50 | 1.91082 | 35.3 | 43.38 |
| 10 | −756.556 | (variable) | | | 42.91 |
| 11 | 37.467 | 5.79 | 1.83481 | 42.7 | 34.86 |
| 12 | 779.999 | 3.27 | | | 34.14 |
| 13 | 72.301 | 2.99 | 1.59522 | 67.7 | 30.47 |
| 14 | −1236.876 | 1.50 | 1.72825 | 28.5 | 29.64 |
| 15 | 28.912 | (variable) | | | 26.78 |
| 16 (diaphragm) | ∞ | 7.3 | | | 25.30 |
| 17 | −18.879 | 1.64 | 1.84666 | 23.8 | 24.50 |
| 18 | 197.444 | 1.21 | 1.69934 | 26.4 | 28.47 |
| 19 | −209.968 | 3.90 | 1.91082 | 35.3 | 28.61 |
| 20 | −42.029 | 0.27 | | | 29.63 |
| 21 | 92.376 | 7.48 | 1.59522 | 67.7 | 31.68 |
| 22 | −33.657 | 0.15 | | | 32.00 |
| 23* | −106.635 | 3.88 | 1.85400 | 40.4 | 33.05 |
| 24 | −41.586 | (variable) | | | 34.12 |
| image plane | ∞ | | | | | aspheric surface data

8th surface

K = 0.00000e+000 B = −3.29635e−006 C = −1.06088e−009
D = −8.09890e−012 E = 1.33588e−014 F = −9.49240e−018

23rd surface

K = 0.00000e+000 B = −6.98994e−006 C = −7.36799e−010
D = −7.33127e−012 E = 6.43354e−015 various types of data

| | |
|---|---|
| focal length | 34.30 |
| F number | 1.45 |
| angle of view | 32.24 |
| image height | 21.64 |
| total lens length | 127.48 |
| BF | 39.05 |

| object distance | ∞ | 300 |
|---|---|---|
| focusing magnification | 0 | −0.18 |
| d10 | 5.93 | 1.70 |
| d15 | 8.60 | 6.48 |
| d24 | 39.05 | 45.40 |

| | |
|---|---|
| entrance pupil position | 34.66 |
| exit pupil position | −43.12 |
| front principal point position | 54.64 |
| rear principal point position | 4.75 | lens unit data

| unit | starting surface | focal length | lens structure length | front principal point position | rear principal point position |
|---|---|---|---|---|---|
| 1 | 1 | −396.15 | 34.44 | −96.68 | −163.46 |
| 2 | 11 | 116.60 | 13.56 | −20.89 | −25.39 |
| 3 | 16 | 42.30 | 25.90 | 23.59 | 10.19 | single lens data

| lens | starting surface | focal length |
|---|---|---|
| 1 | 1 | −59.72 |
| 2 | 3 | −128.19 |
| 3 | 5 | 99.45 |
| 4 | 7 | −117.60 |
| 5 | 9 | 64.05 |
| 6 | 11 | 46.98 |
| 7 | 13 | 114.86 |
| 8 | 14 | −38.77 |
| 9 | 17 | −20.28 |
| 10 | 18 | 145.68 |
| 11 | 19 | 57.06 |
| 12 | 21 | 42.38 |
| 13 | 23 | 77.69 |

Various numerical values in each numerical embodiment are shown in Table 1.

TABLE 1

| | | FIRST EMBODIMENT | SECOND EMBODIMENT | THIRD EMBODIMENT | FOURTH EMBODIMENT | FIFTH EMBODIMENT | SIXTH EMBODIMENT |
|---|---|---|---|---|---|---|---|
| | f | 52.13 | 34.30 | 24.55 | 85.00 | 36.04 | 34.30 |
| | ff | 159.34 | 107.91 | 85.84 | 283.91 | 90.96 | 107.91 |
| | fr | 43.01 | 42.30 | 19.22 | 55.12 | 32.18 | 42.30 |
| CONDITIONAL EXPRESSION (3) | f/fr | 1.212 | 0.811 | 1.278 | 1.542 | 1.120 | 0.811 |
| CONDITIONAL EXPRESSION (4) | ff/fr | 3.705 | 2.551 | 4.467 | 5.151 | 2.827 | 2.551 |
| CONDITIONAL EXPRESSION (1) | Te1/T1 | 0.69 | 0.87 | 0.64 | 0.64 | 0.69 | 0.62 |
| CONDITIONAL EXPRESSION (2) | Te2/T2 | 0.10 | 0.12 | 0.23 | 0.20 | 0.10 | 0.13 |
| | hi1 | 18.02 | 17.05 | 12.56 | 34.27 | 18.02 | 17.05 |
| | hm1 | 15.89 | 15.37 | 11.41 | 30.16 | 15.89 | 15.37 |
| | hi2 | 15.50 | 15.84 | 15.55 | 19.58 | 15.50 | 15.84 |
| | hm2 | 15.50 | 15.80 | 15.58 | 19.58 | 15.50 | 15.80 |
| CONDITIONAL EXPRESSION (5) | hm1/hi1 | 0.88 | 0.90 | 0.91 | 0.88 | 0.88 | 0.90 |

TABLE 1-continued

|  |  | FIRST EMBODIMENT | SECOND EMBODIMENT | THIRD EMBODIMENT | FOURTH EMBODIMENT | FIFTH EMBODIMENT | SIXTH EMBODIMENT |
|---|---|---|---|---|---|---|---|
| CONDITIONAL EXPRESSION (6) | hm2/hi2 | 1.00 | 1.00 | 1.00 | 1.00 | 1.00 | 1.00 |
| CONDITIONAL EXPRESSION (7) | Th1/T1 | 0.99 | 1.00 | 1.00 | 1.00 | 0.99 | 0.98 |
| CONDITIONAL EXPRESSION (8) | Th2/T2 | 0.99 | 1.00 | 1.00 | 1.00 | 0.99 | 0.98 |
| CONDITIONAL EXPRESSION (10) | ω | 22.5 | 32.2 | 41.4 | 14.3 | 20.8 | 32.2 |
|  | Lf | 26.90 | 62.53 | 54.17 | 57.21 | 17.77 | 62.53 |
|  | Lr | 23.90 | 25.90 | 26.96 | 30.59 | 22.50 | 25.90 |
|  | LF1 | 26.90 | 28.09 | 24.55 | 55.21 | 17.77 | 28.09 |
|  | LF2 | 20.70 | 14.39 | 13.22 | 24.27 | 13.57 | 14.39 |
| CONDITIONAL EXPRESSION (11) | LF1/Lf | 1.00 | 0.45 | 0.45 | 0.97 | 1.00 | 0.45 |
| CONDITIONAL EXPRESSION (12) | LF2/Lr | 0.87 | 0.56 | 0.49 | 0.79 | 0.60 | 0.56 |

Optical Apparatus

Figure 14:
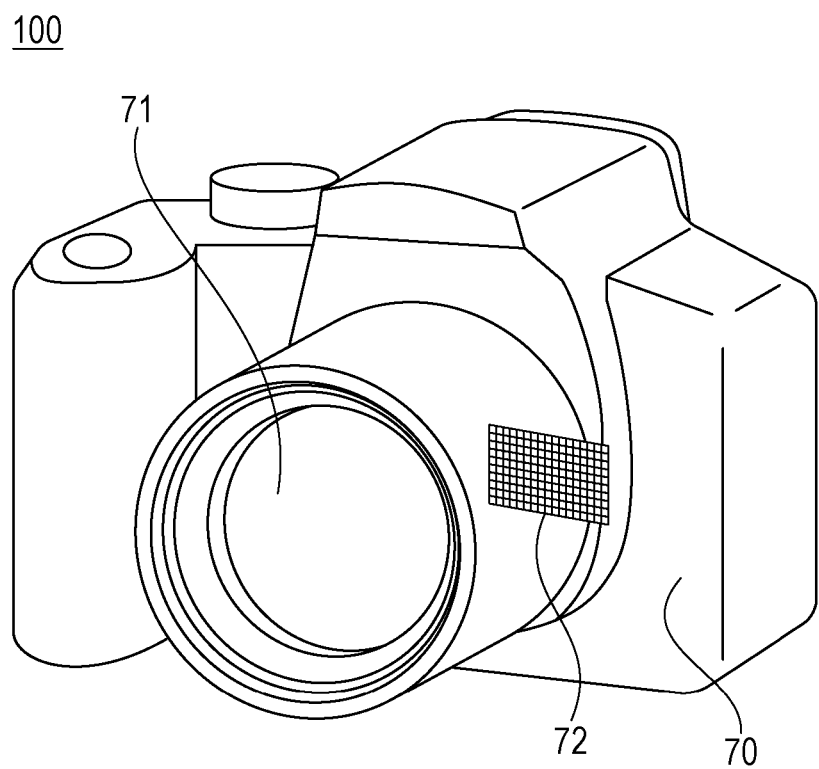
FIG. 14 is a schematic diagram of an image pickup apparatus.

FIG. 14 is a schematic diagram of an image pickup apparatus (a digital still camera) 100 as an optical apparatus as an embodiment of the present disclosure. The image pickup apparatus 100 of the present embodiment includes a camera body 70, an optical system 71 equivalent to any one of the first embodiment to the sixth embodiment described above, and a light-receiving element (an image pickup element) 72 which performs photoelectric conversion of an image formed by the optical system 71.

Since the image pickup apparatus 100 of the present embodiment includes an optical element according to any one of the embodiments described above, an image in which a change in the apodization effect caused by a change in the in-focus distance is reduced can be obtained. The light-receiving element 72 may be, for example, an image pickup element, such as a CCD sensor and a CMOS sensor. A quality of an output image may be improved by electrically correcting various aberrations of the image obtained by the light-receiving element 72, such as distortion aberration and chromatic aberration.

The optical system of each embodiment described above is not limited to the digital still camera illustrated in FIG. 14, and is applicable also to various optical apparatuses, such as a silver-halide film camera, a video camera, and a telescope.

Embodiments and Examples of the present disclosure are described above, however, the present disclosure is not limited to the same. Various combinations, modifications and changes may be made without departing from the scope of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-173141, filed Sep. 5, 2016, which is hereby incorporated by reference herein in its entirety.

What is claimed is:

1. An optical system which includes a plurality of lens elements and in which at least one of the plurality of lens elements moves during focusing, the optical system comprising:
   an aperture diaphragm;
   a first optical element disposed on a light incident side of the aperture diaphragm and having transmittance distribution; and
   a second optical element disposed on a light emission side of the aperture diaphragm and having transmittance distribution,
   wherein the following conditional expressions are satisfied:

$$0.6 \leq Te1/T1 \leq 1$$

$$0 \leq Te2/T2 \leq 0.4$$

where T1 is a maximum transmittance of the first optical element, T2 is a maximum transmittance of the second optical element, Te1 is transmittance of the first optical element at a position in which a marginal ray of an on-axis light flux enters the first optical element when the aperture diaphragm is opened and the optical system focuses on infinity, and Te2 is transmittance of the second optical element at a position in which the marginal ray enters the second optical element when the aperture diaphragm is opened and the optical system focuses on infinity.

2. The optical system according to claim 1, wherein the following conditional expression is satisfied:

$$0.6 \leq f/fr \leq 4$$

where f is a focal length of an entire system of the optical system when focusing on infinity, and fr is a focal length of a partial optical system disposed on the light emission side of the aperture diaphragm when focusing on infinity.

3. The optical system according to claim 1, wherein the following conditional expression is satisfied: f $$1.4 \leq f/fr \leq 10$$

where ff is a focal length of a partial optical system disposed on the light incident side of the aperture diaphragm when focusing on infinity, and fr is a focal length of a partial optical system disposed on the light emission side of the aperture diaphragm when focusing on infinity.

4. The optical system according to claim 1, wherein the following conditional expression is satisfied:

$$0.6 \leq hm1/hi1 \leq 0.96$$

where hi1 is a height at which the marginal ray enters the first optical element when the aperture diaphragm is opened and the optical system focuses on infinity, and hm1 is a height at which the marginal ray enters the first optical element when the aperture diaphragm is opened and the optical system focuses on the closest focusing distance.

5. The optical system according to claim 1, wherein the following conditional expression is satisfied:

$$0.85 \leq hm2/hi2 \leq 1.15$$

where hi2 is a height at which the marginal ray enters the second optical element when the aperture diaphragm is opened and the optical system focuses on infinity, and hm2 is a height at which the marginal ray enters the second optical element when the aperture diaphragm is opened and the optical system focuses on the closest focusing distance.

6. The optical system according to claim 1, wherein the following conditional expression is satisfied:

$$0.85 \leq Th1/T1$$

where Th1 is transmittance of the first optical element at a position in which a distance from the optical axis in the first optical element is hi1/2, hi1 being defined as a distance from a position in which the marginal ray enters the first optical element to an optical axis when the aperture diaphragm is opened and the optical system focuses on infinity.

7. The optical system according to claim 1, wherein the following conditional expression is satisfied:

$$0.85 \leq Th2/T2$$

where Th2 is transmittance of the second optical element at a position in which a distance from the optical axis in the second optical element is hi2/2, hi2 being defined as a distance from a position in which the marginal rays enter the second optical element to the optical axis when the aperture diaphragm is opened and the optical system focuses on infinity.

8. The optical system according to claim 1, wherein following conditional expression is satisfied:

$$0.25 \leq LF1/Lf$$

where Lf is a distance on the optical axis from a surface of the optical system closest to an object to the aperture diaphragm, and LF1 is a distance on the optical axis from the aperture diaphragm to a surface of the first optical element closer to the aperture diaphragm.

9. The optical system according to claim 1, wherein the following conditional expression is satisfied:

$$0.25 \leq LF2/Lr$$

where Lr is a distance on the optical axis from a surface of the optical system closest to an image plane to the aperture diaphragm, and LF2 is a distance on the optical axis from the aperture diaphragm to a surface of the second optical element closer to the aperture diaphragm.

10. The optical system according to claim 1, further comprising a partial optical system having positive refractive power disposed on the light incident side of the aperture diaphragm, and a partial optical system having positive refractive power disposed on the light emission side of the aperture diaphragm,
wherein the entire system moves to the object side during focusing from the infinity to the closest focusing distance.

11. The optical system according to claim 1, wherein the optical system includes a first lens unit having negative refractive power, a second lens unit having positive refractive power, and a third lens unit having positive refractive power including the aperture diaphragm disposed in this order from the object side to the image side,
the first lens unit includes the first optical element,
the third lens unit includes the second optical element, and
during focusing from infinity to the closest focusing distance, the first lens unit is fixed, the second lens unit and the third lens unit move to the object side, and a distance between the second lens unit and the third lens unit changes.

12. The optical system according to claim 1, wherein the optical system includes a first lens unit having negative refractive power, a second lens unit having positive refractive power, and a third lens unit having positive refractive power including the aperture diaphragm disposed in this order from the object side to the image side,
the second lens unit includes the first optical element,
the third lens unit includes the second optical element, and
during focusing from infinity to the closest focusing distance, the first lens unit is fixed, the second lens unit and the third lens unit move to the object side, and a distance between the second lens unit and the third lens unit changes.

13. The optical system according to claim 1, wherein the optical system includes a first lens unit having positive refractive power including the aperture diaphragm, and a second lens unit having positive refractive power disposed in this order from the object side to the image side,
the first lens unit includes the first optical element and the second optical element, and
during focusing from infinity to the closest focusing distance, the first lens unit moves to the object side, and the second lens unit is fixed.

14. An optical apparatus, which includes an optical system provided with a plurality of lens elements including a lens which moves during focusing, and an image pickup element which receives an image formed by the optical system,
the optical apparatus comprising:
an aperture diaphragm;
a first optical element disposed on a light incident side of the aperture diaphragm and having transmittance distribution; and
a second optical element disposed on a light emission side of the aperture diaphragm and having transmittance distribution,
wherein the following conditional expressions are satisfied:

$$0.6 \leq Te1/T1 \leq 1$$

$$0 \leq Te2/T2 \leq 0.4$$

where T1 is a maximum transmittance of the first optical element, T2 is a maximum transmittance of the second optical element, Te1 is transmittance of the first optical element at a position in which a marginal ray of an on-axis light flux enters the first optical element when the aperture diaphragm is opened and the optical system focuses on infinity, and Te2 is transmittance of the second optical element at a position in which the marginal ray enters the second optical element when the aperture diaphragm is opened and the optical system focuses on infinity.

* * * * *